US011309092B2

(12) United States Patent
Onderwater et al.

(10) Patent No.: US 11,309,092 B2
(45) Date of Patent: *Apr. 19, 2022

(54) TARGET IRRADIATION SYSTEMS FOR THE PRODUCTION OF RADIOISOTOPES

(71) Applicant: BWXT Isotope Technology Group, Inc., Lynchburg, VA (US)

(72) Inventors: Thomas G. Onderwater, Peterborough (CA); Mark A. Alboino, Toronto (CA); Benjamin D. Fisher, Lynchburg, VA (US); Andrew F. Long, Peterborough (CA)

(73) Assignee: BWXT Isotope Technology Group, Inc., Lynchburg, VA (US)

( * ) Notice: Subject to any disclaimer, the term of this patent is extended or adjusted under 35 U.S.C. 154(b) by 197 days.

This patent is subject to a terminal disclaimer.

(21) Appl. No.: 16/551,185

(22) Filed: Aug. 26, 2019

(65) Prior Publication Data

US 2020/0090824 A1      Mar. 19, 2020

Related U.S. Application Data

(60) Provisional application No. 62/723,328, filed on Aug. 27, 2018.

(51) Int. Cl.
  *G21G 1/02*         (2006.01)
  *G21C 1/30*         (2006.01)
  (Continued)

(52) U.S. Cl.
  CPC ............ *G21C 1/303* (2013.01); *G21G 1/001* (2013.01); *G21G 1/02* (2013.01); *G21G 1/08* (2013.01);
  (Continued)

(58) Field of Classification Search
  CPC ........ G21C 1/303; G21C 19/20; G21C 23/00; G21G 1/02; G21K 5/08; H05H 6/00; G01N 2035/0481
  (Continued)

(56) References Cited

U.S. PATENT DOCUMENTS 3,069,337  A     12/1962  Cabell
3,549,492  A  *  12/1970  Ricci ...................... G21C 1/303
                                                              376/344
(Continued)

FOREIGN PATENT DOCUMENTS

JP         S58152714 A  *  9/1983
WO      2016/207054 A1      12/2016
(Continued)

OTHER PUBLICATIONS

U.S. Appl. No. 16/548,952, filed Aug. 23, 2019, Thomas G. Onderwater.
(Continued)

*Primary Examiner* — Jack W Keith
*Assistant Examiner* — Jinney Kil
(74) *Attorney, Agent, or Firm* — Nelson Mullins Riley & Scarborough LLP

(57) ABSTRACT

A target irradiation system for irradiating a radioisotope target in a vessel penetration of a fission reactor, including a target elevator assembly including a body portion defining a central bore and an open bottom end, a center tube that is disposed within the central bore of the body portion, a target basket that is slidably receivable within the center tube, and a winch that is connected to the target basket by a cable, wherein the target basket is configured to receive the radioisotope target therein and be lowered into the vessel penetration of the reactor when irradiating the radioisotope target.

12 Claims, 33 Drawing Sheets

(51) Int. Cl.
*G21K 5/08* (2006.01)
*G21G 1/00* (2006.01)
*G21G 1/08* (2006.01)

(52) U.S. Cl.
CPC ....... *G21K 5/08* (2013.01); *G21G 2001/0036* (2013.01)

(58) Field of Classification Search
USPC .......................................... 376/202, 340, 342
See application file for complete search history.

(56) References Cited

U.S. PATENT DOCUMENTS

| | | | | |
|---|---|---|---|---|
| 3,681,194 | A * | 8/1972 | Dieck | B65G 51/36 376/259 |
| 4,196,047 | A * | 4/1980 | Mitchem | G21C 1/303 376/202 |
| 5,414,742 | A | 5/1995 | Hornak et al. | |
| 5,615,238 | A * | 3/1997 | Wiencek | G21G 1/02 29/17.3 |
| 8,050,377 | B2 * | 11/2011 | Russell, II | G21C 3/326 376/202 |
| 2009/0135983 | A1 * | 5/2009 | Russell, II | G21G 1/02 376/190 |
| 2011/0051872 | A1 * | 3/2011 | Rickard | G21G 1/02 376/190 |
| 2011/0051874 | A1 | 3/2011 | Allen et al. | |
| 2013/0170927 | A1 | 7/2013 | Dayal et al. | |
| 2013/0177126 | A1 | 7/2013 | Runkle et al. | |
| 2013/0223578 | A1 | 8/2013 | Russell, II et al. | |
| 2017/0062085 | A1 | 3/2017 | Caine et al. | |
| 2017/0271033 | A1 | 9/2017 | Dodson et al. | |
| 2018/0025802 | A1 | 1/2018 | Richter et al. | |
| 2019/0043630 | A1 * | 2/2019 | Fisher | G21C 3/326 |
| 2020/0027618 | A1 * | 1/2020 | Onderwater | G21G 1/001 |
| 2020/0075180 | A1 | 3/2020 | Onderwater et al. | |

FOREIGN PATENT DOCUMENTS

| | | |
|---|---|---|
| WO | 2020046743 A1 | 3/2020 |
| WO | 2020046800 A1 | 3/2020 |

OTHER PUBLICATIONS

International Search Report and Written Opinion, PCT/US2019/47882, dated Feb. 6, 2020, 9 pages.
International Search Report and Written Opinion, PCT/US2019/048112, dated Oct. 24, 2019, 6 pages.

* cited by examiner

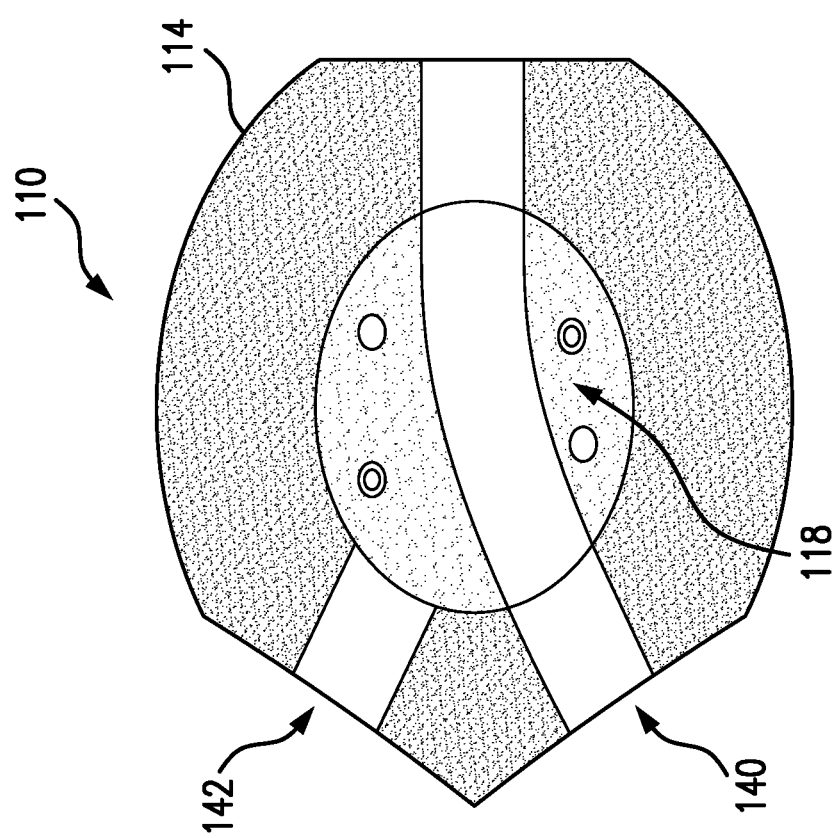

TARGET IRRADIATION SYSTEMS FOR THE PRODUCTION OF RADIOISOTOPES

CLAIM OF PRIORITY

This application claims priority to U.S. provisional patent application No. 62/723,328 filed Aug. 27, 2018, the disclosure of which is incorporated by reference herein.

TECHNICAL FIELD

The presently-disclosed invention relates generally to systems for irradiating radioisotope targets in nuclear reactors and, more specifically, to systems for irradiating radioisotope targets in heavy water-moderated fission-type nuclear reactors.

BACKGROUND

Technetium-99m (Tc-99m) is the most commonly used radioisotope in nuclear medicine (e.g., medical diagnostic imaging). Tc-99m (m is metastable) is typically injected into a patient and, when used with certain equipment, is used to image the patient's internal organs. However, Tc-99m has a half-life of only six (6) hours. As such, readily available sources of Tc-99m are of particular interest and/or need in at least the nuclear medicine field.

Given the short half-life of Tc-99m, Tc-99m is typically obtained at the location and/or time of need (e.g., at a pharmacy, hospital, etc.) via a Mo-99/Tc-99m generator. Mo-99/Tc-99m generators are devices used to extract the metastable isotope of technetium (i.e., Tc-99m) from a source of decaying molybdenum-99 (Mo-99) by passing saline through the Mo-99 material. Mo-99 is unstable and decays with a 66-hour half-life to Tc-99m. Mo-99 is typically produced in a high-flux nuclear reactor from the irradiation of highly-enriched uranium targets (93% Uranium-235) and shipped to Mo-99/Tc-99m generator manufacturing sites after subsequent processing steps to reduce the Mo-99 to a usable form, such as titanium-molybdate-99 (Ti—Mo99). Mo-99/Tc-99m generators are then distributed from these centralized locations to hospitals and pharmacies throughout the countries. Since Mo-99 has a short half-life and the number of existing production sites are limited, it is desirable both to minimize the amount of time needed to reduce the irradiated Mo-99 material to a useable form and to increase the number of sites at which the irradiation process can occur.

There at least remains a need, therefore, for a system and a process for producing a titanium-molybdate-99 material suitable for use in Tc-99m generators in a timely manner.

SUMMARY OF INVENTION

One embodiment of the present disclosure provides a target irradiation system for irradiating a radioisotope target in a vessel penetration of a fission reactor, including a target elevator assembly including a body portion defining a central bore and an open bottom end, a center tube that is disposed within the central bore of the body portion, a target basket that is slidably receivable within the center tube, and a winch that is connected to the target basket by a cable, the target elevator assembly being affixed to the vessel penetration of the reactor, and a target passage that is in fluid communication with the target elevator assembly, wherein the target basket is configured to receive the radioisotope target therein via the target passage and be lowered into the vessel penetration of the reactor when irradiating the radioisotope target, and the target elevator assembly forms a portion of the pressure boundary of the reactor when in fluid communication with the reactor.

The accompanying drawings, which are incorporated in and constitute a part of this specification, illustrate one or more embodiments of the invention and, together with the description, serve to explain the principles of the invention.

BRIEF DESCRIPTION OF THE DRAWINGS

The invention now will be described more fully hereinafter with reference to the accompanying drawings, in which some, but not all, embodiments of the invention are shown. Indeed, this invention may be embodied in many different forms and should not be construed as limited to the embodiments set forth herein; rather, these embodiments are provided so that this disclosure will satisfy applicable legal requirements.

FIGS. 3A through 3D are partial cut-away views of a target diverter of the target irradiation system shown in FIG. 1;

FIGS. 5A through 5J are schematic diagrams of the target irradiation system shown in FIG. 1.

Figure 1:
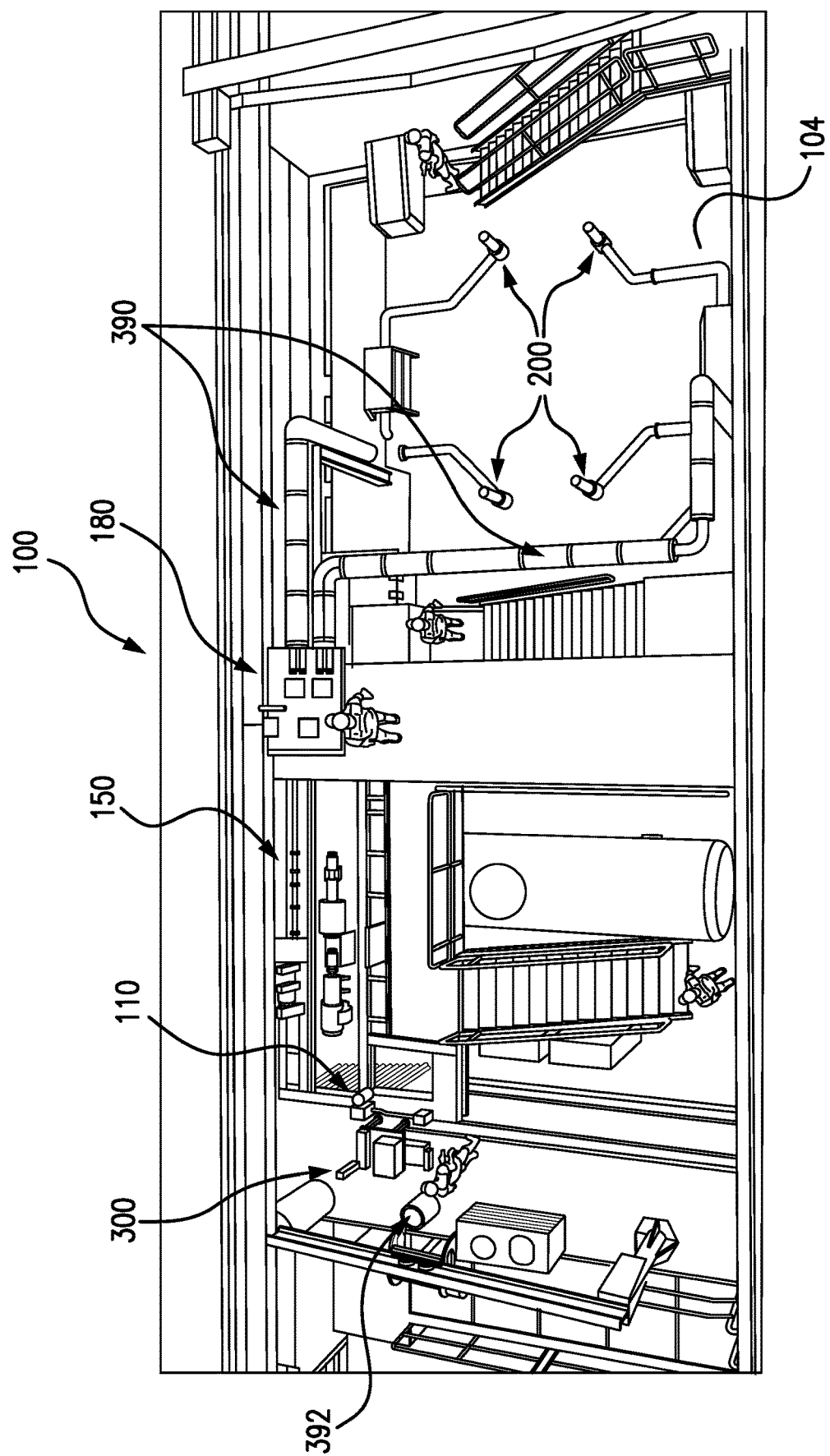
FIG. 1 is a perspective view of a target irradiation system, in accordance with an embodiment of the present disclosure, installed on a CANDU (CANada Deuterium Uranium) reactor.

Repeat use of reference characters in the present specification and drawings is intended to represent same or analogous features or elements of the invention according to the disclosure.

DETAILED DESCRIPTION

The invention now will be described more fully hereinafter with reference to the accompanying drawings, in which some, but not all, embodiments of the invention are shown. Indeed, this invention may be embodied in many different forms and should not be construed as limited to the embodiments set forth herein; rather, these embodiments are provided so that this disclosure will satisfy applicable legal requirements. As used in the specification, and in the appended claims, the singular forms "a", "an", "the", include plural referents unless the context clearly dictates otherwise.

The present target irradiation system 100 includes both elements that will be exposed to reactor neutron flux within the core of the reactor, preferably a CANDU (CANada Deuterium Uranium) reactor, and elements that will be affixed to the CANDU reactor civil structures outside of the reactor core. The system also includes a target capsule 190 (FIGS. 2A and 2B) that is designed to interface with the other system elements. There are several components which work together to form the system, FIG. 1 illustrating the system installed on a CANDU reactor.

Figure 5A:
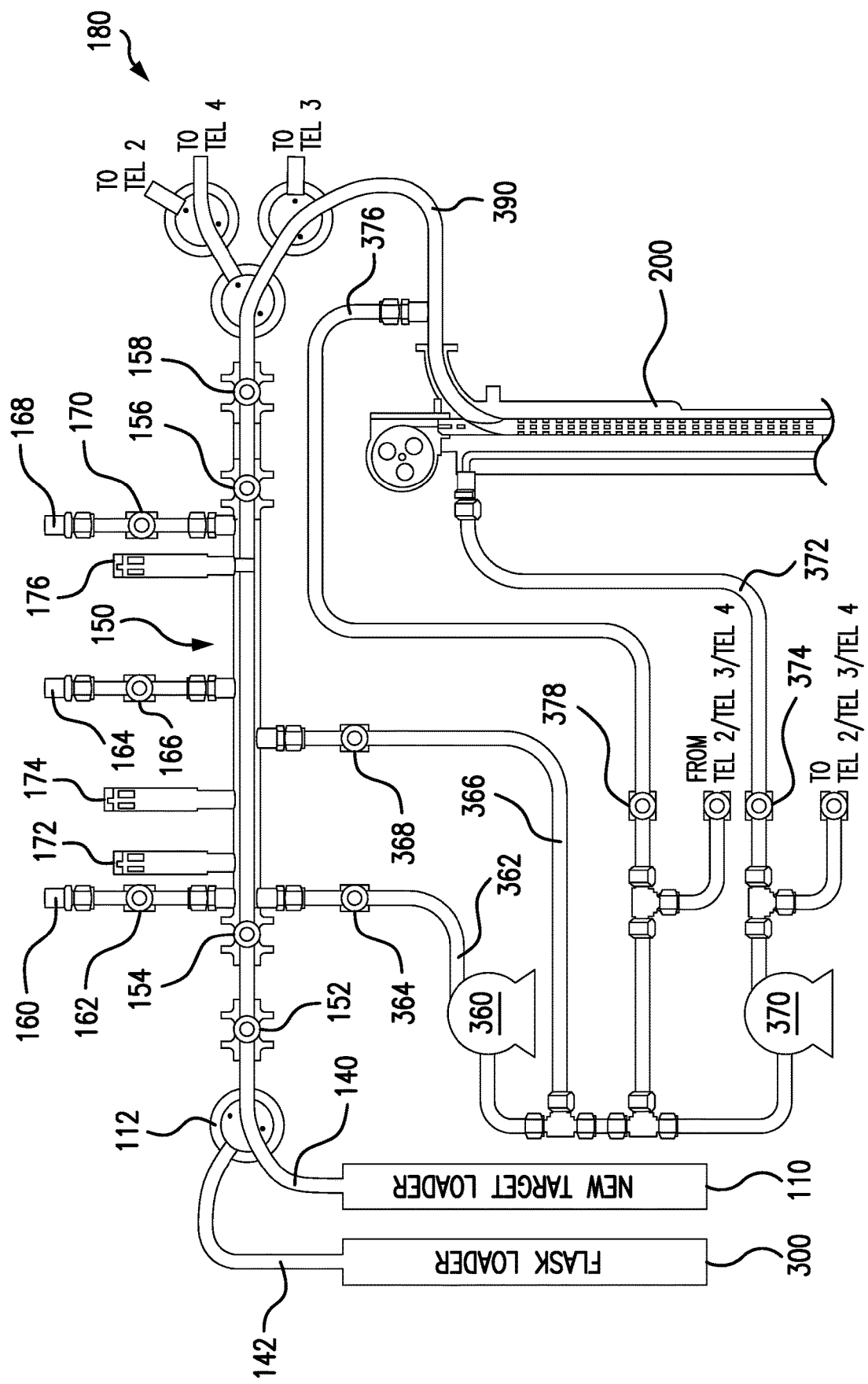
Figure 5B:
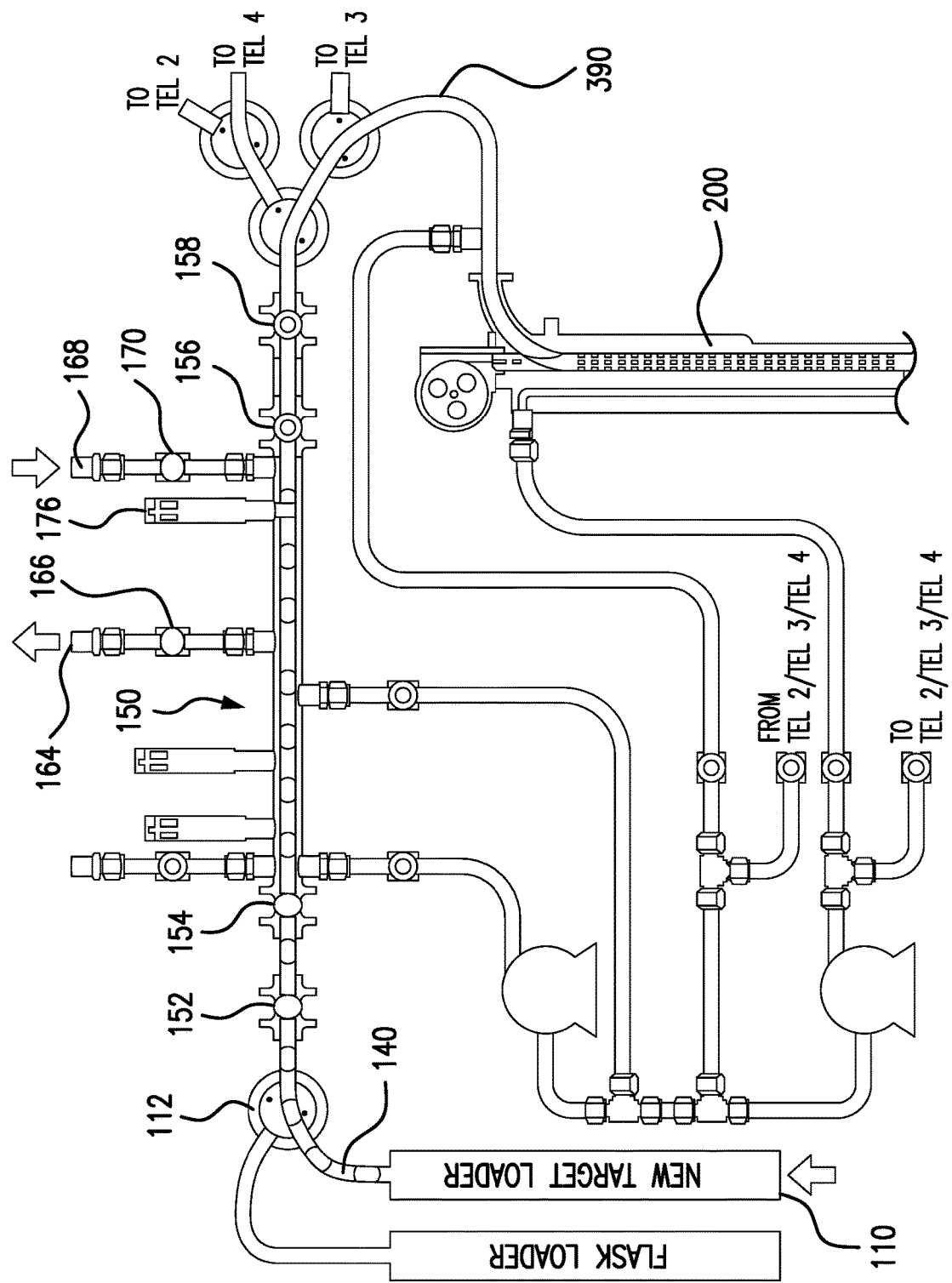
Figure 5C:
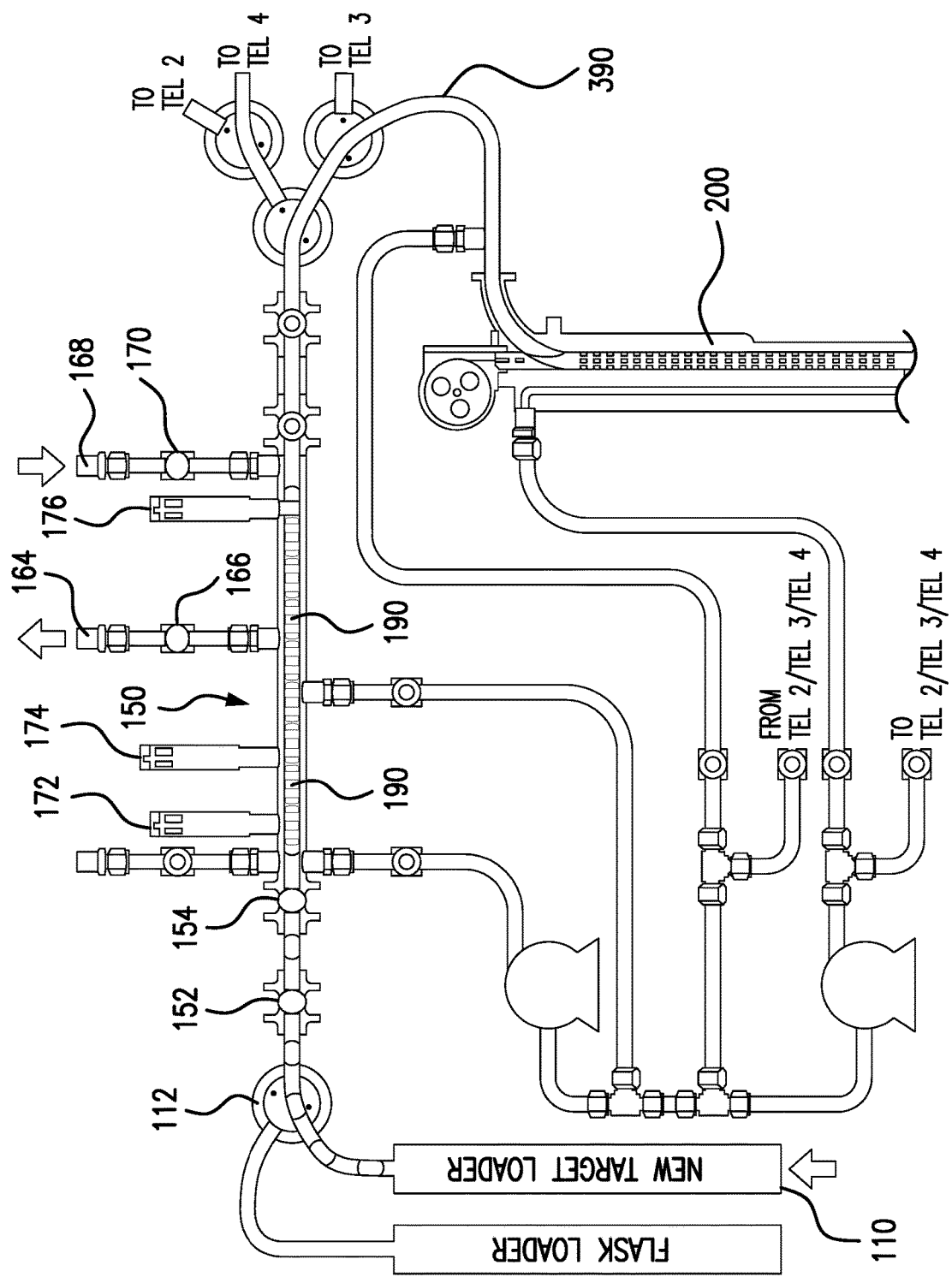
Figure 5D:
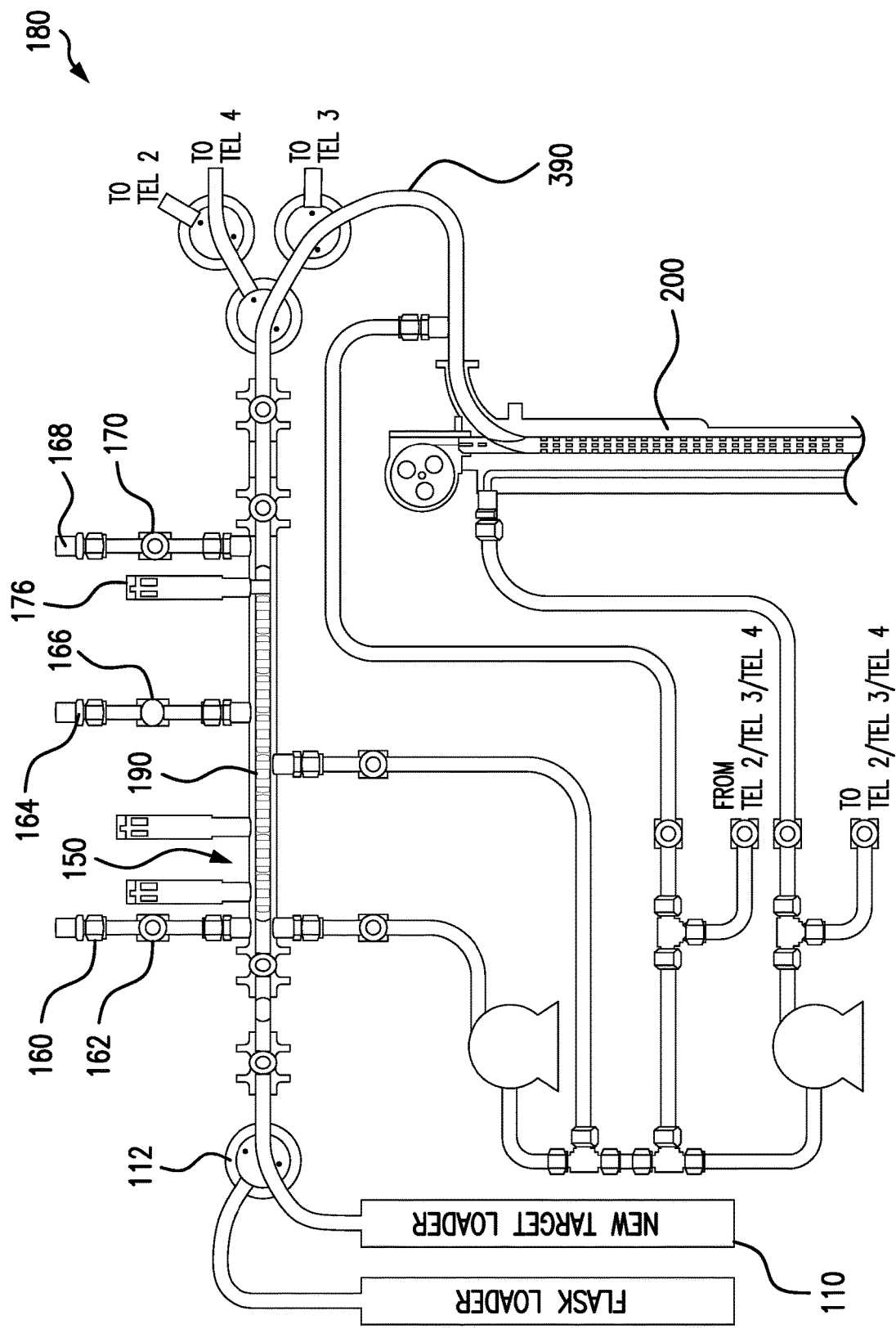
Figure 5E:
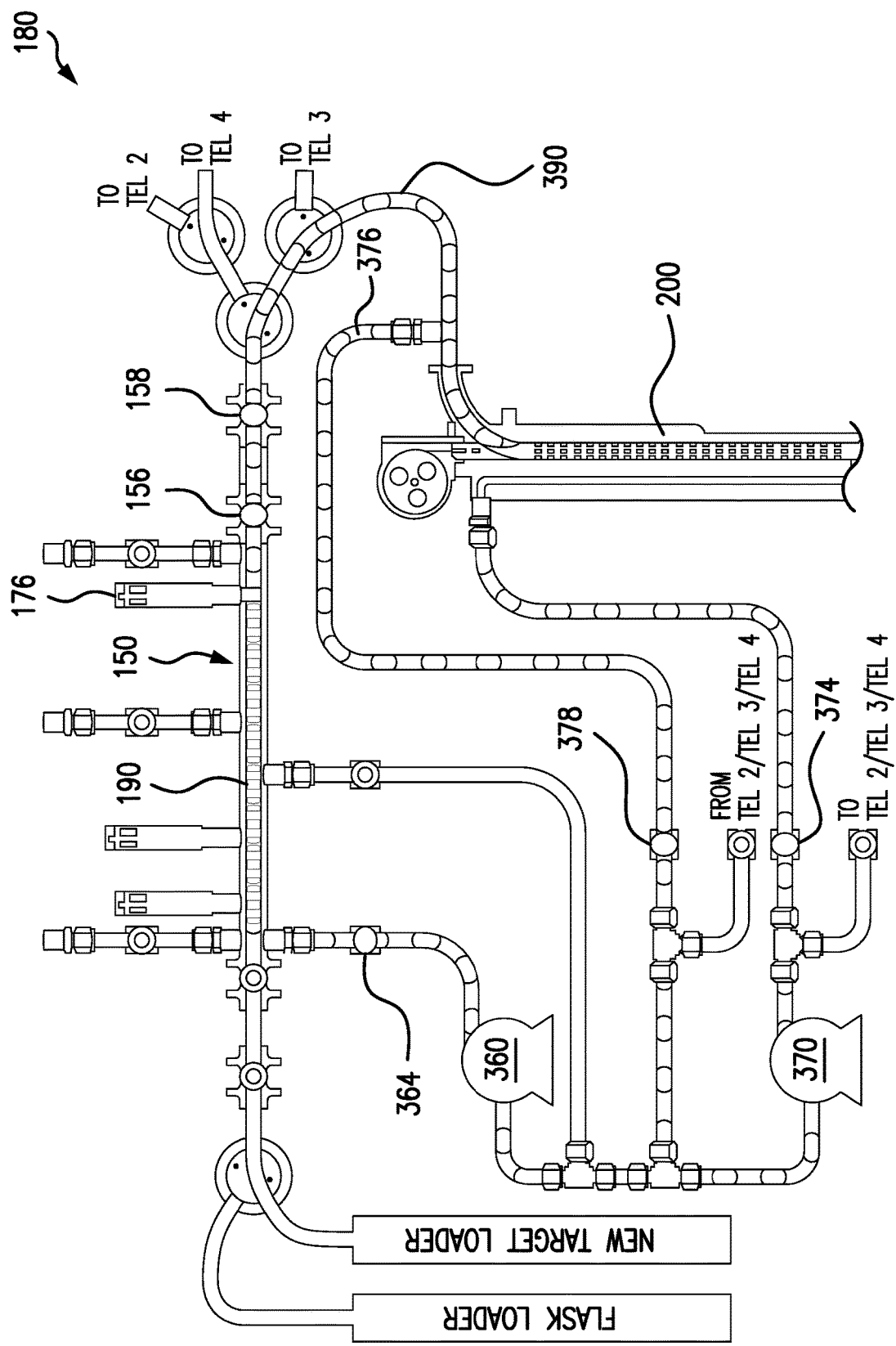
Figure 5F:
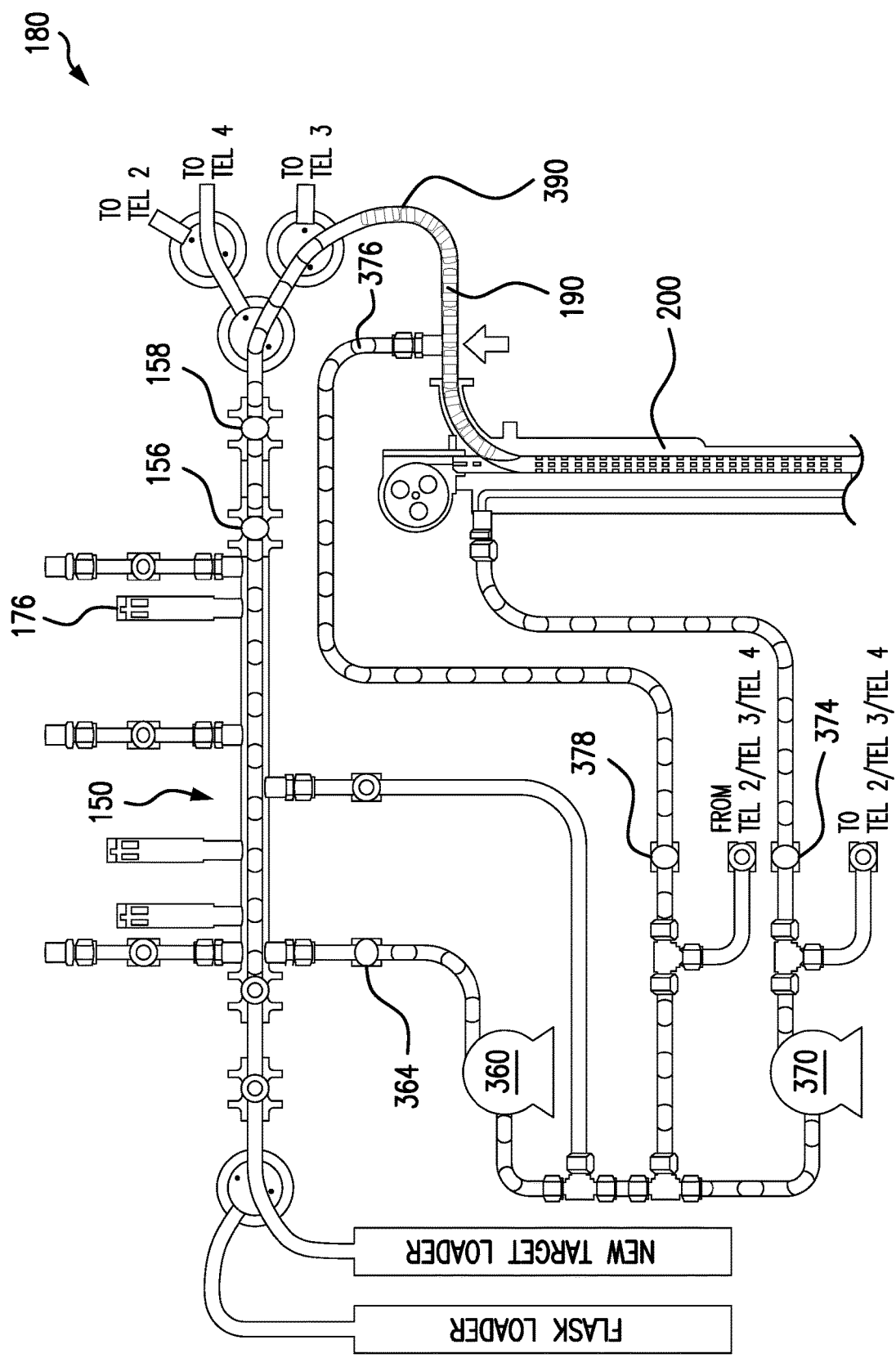
Figure 5G:
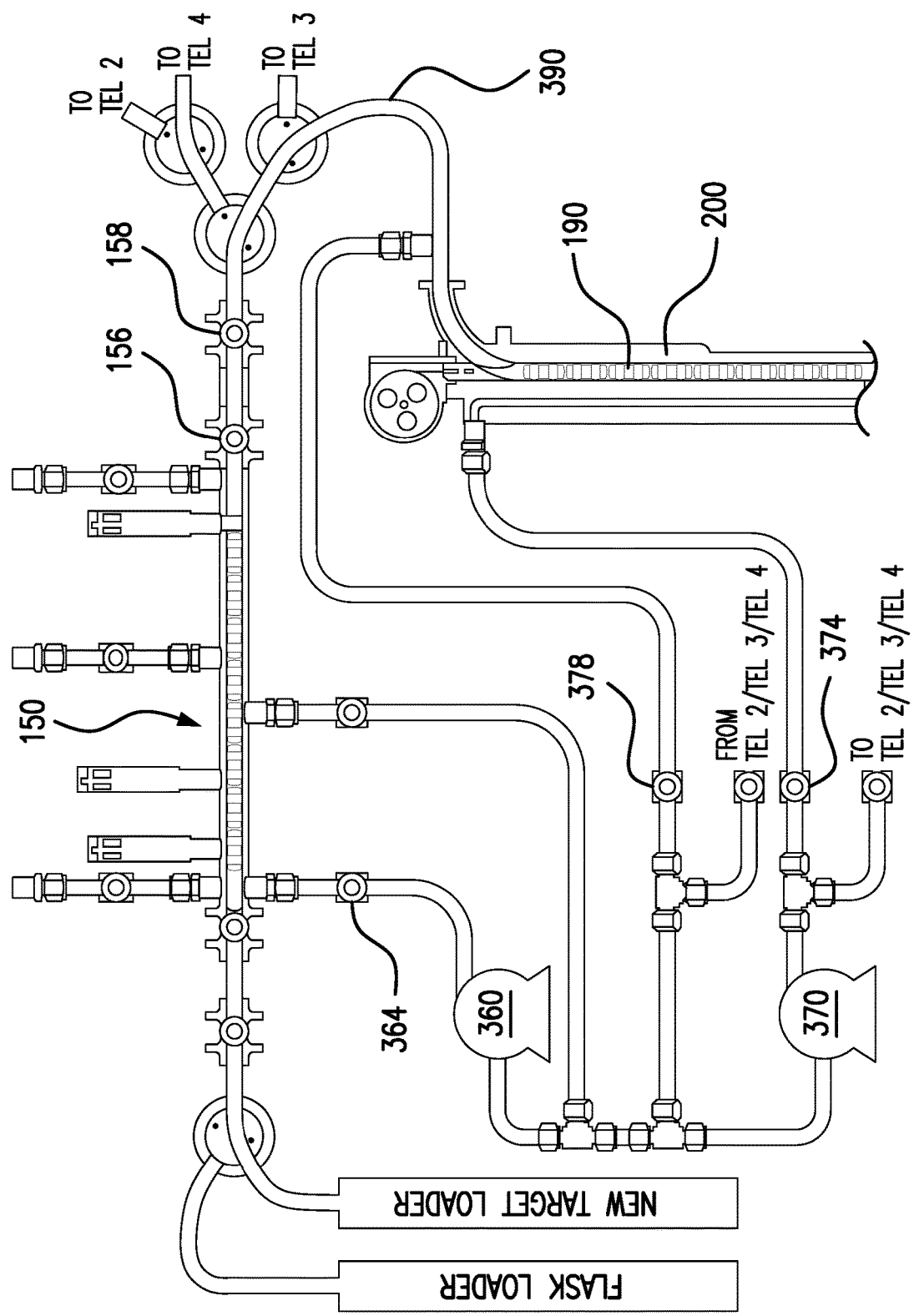
Figure 5H:
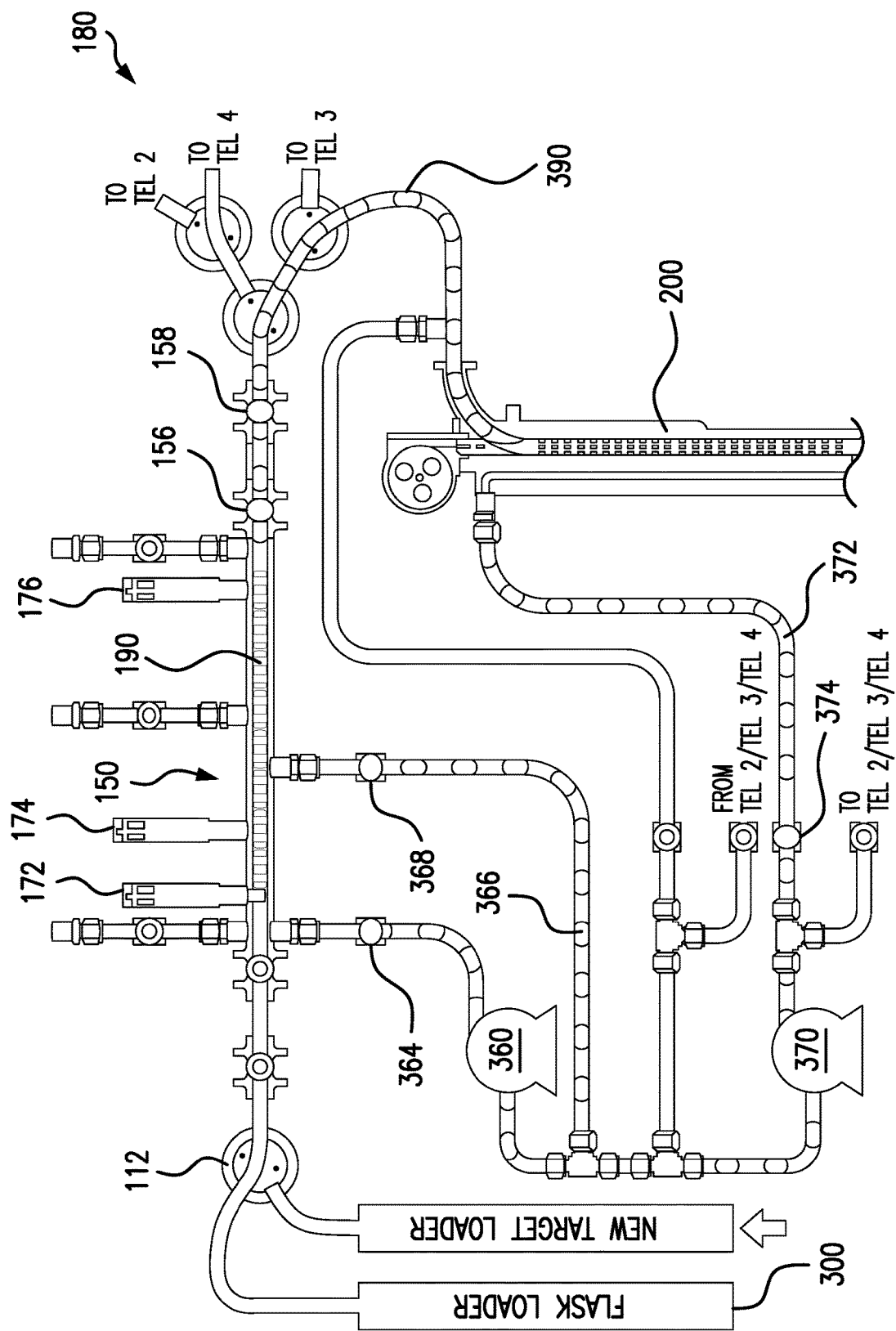
Figure 51:
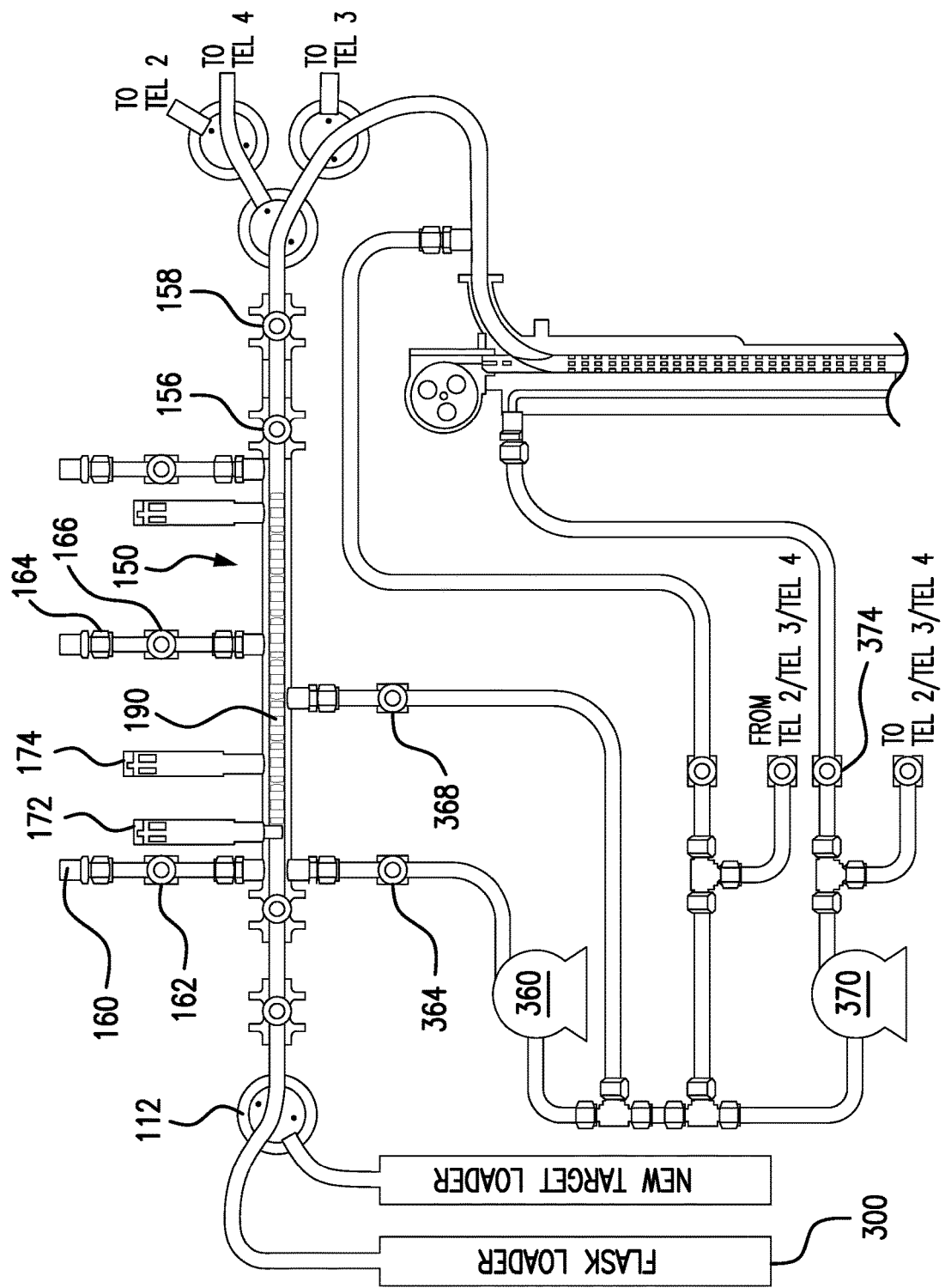
Figure 5J:
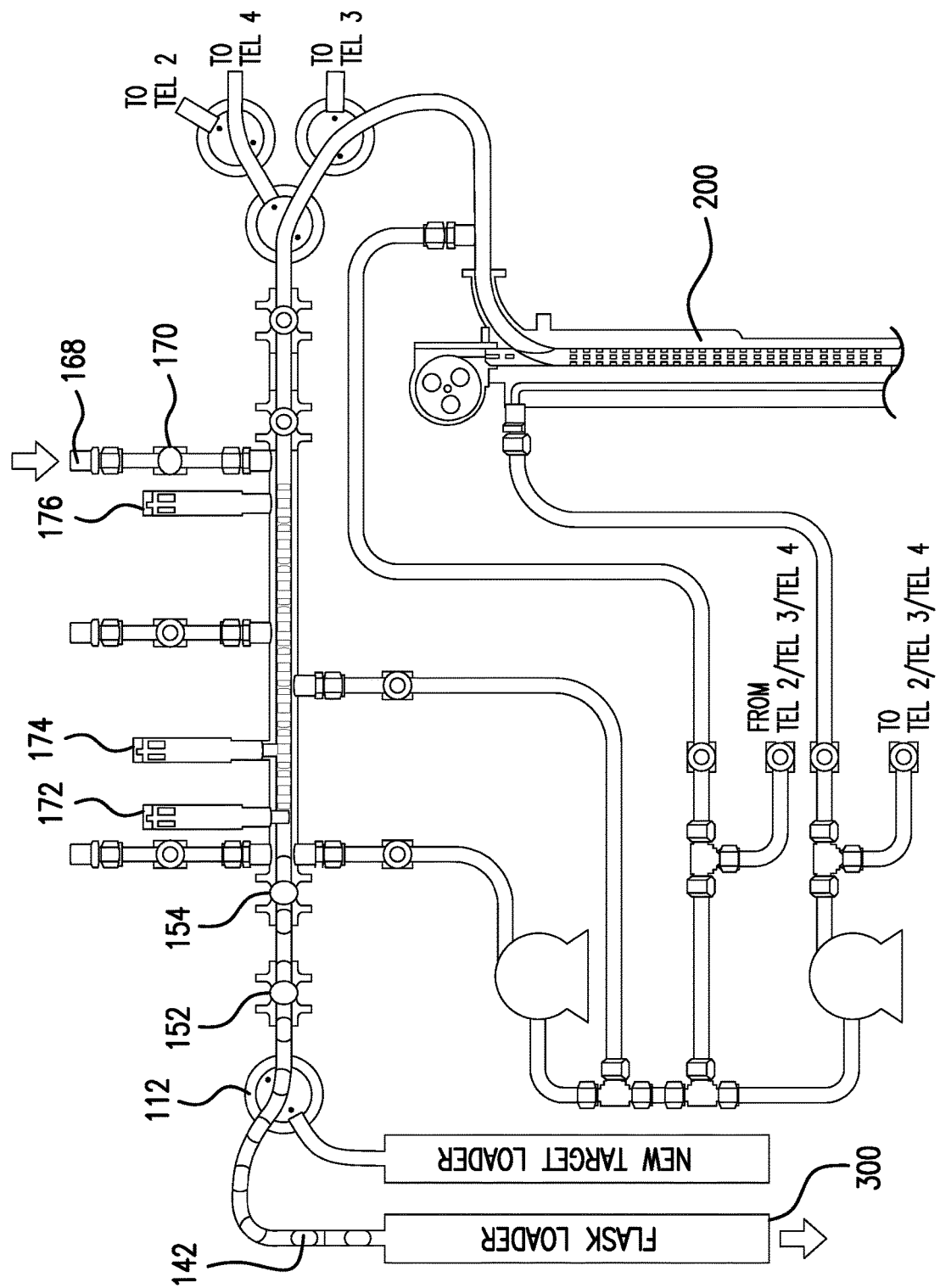
Figure 6A:
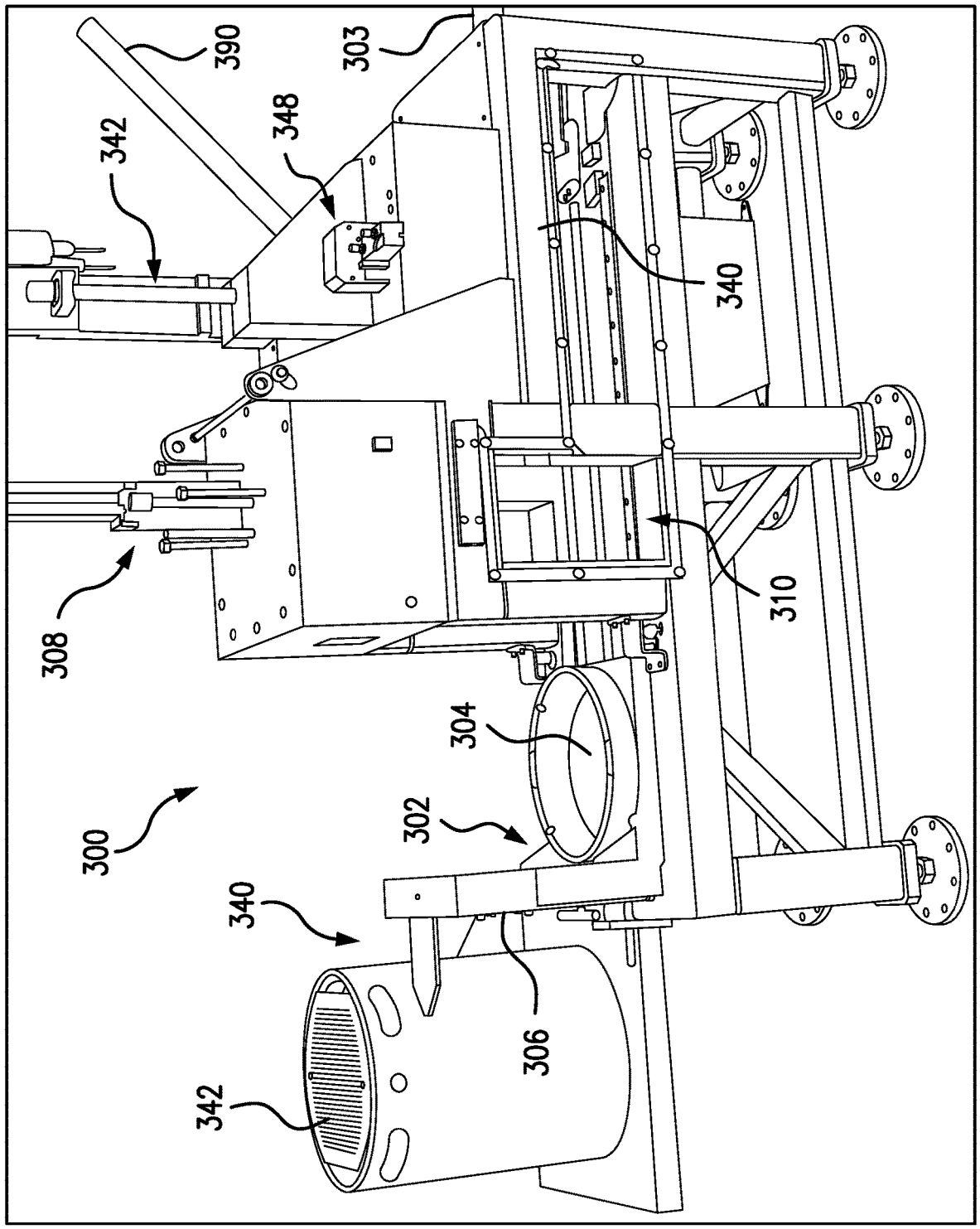
FIGS. 6A and 6B through 6H are a perspective and partial cut-away views, respectively, of a flask loader assembly of the target irradiation system shown in FIG. 1.

As shown in FIGS. 1 and 6A, the in-core target irradiation system 100 preferably includes a new target loader 110, a path diverter assembly 112 (FIGS. 3A through 3D) an airlock 150, target elevator diverter assemblies 180, a pneumatic target transfer system including target transfer piping 390, one or more target elevator assemblies 200 (FIGS. 4A through 4I), and a flask loader assembly 300 (FIGS. 5A through 5H), each of which is described in greater detail below.

Figure 4A:
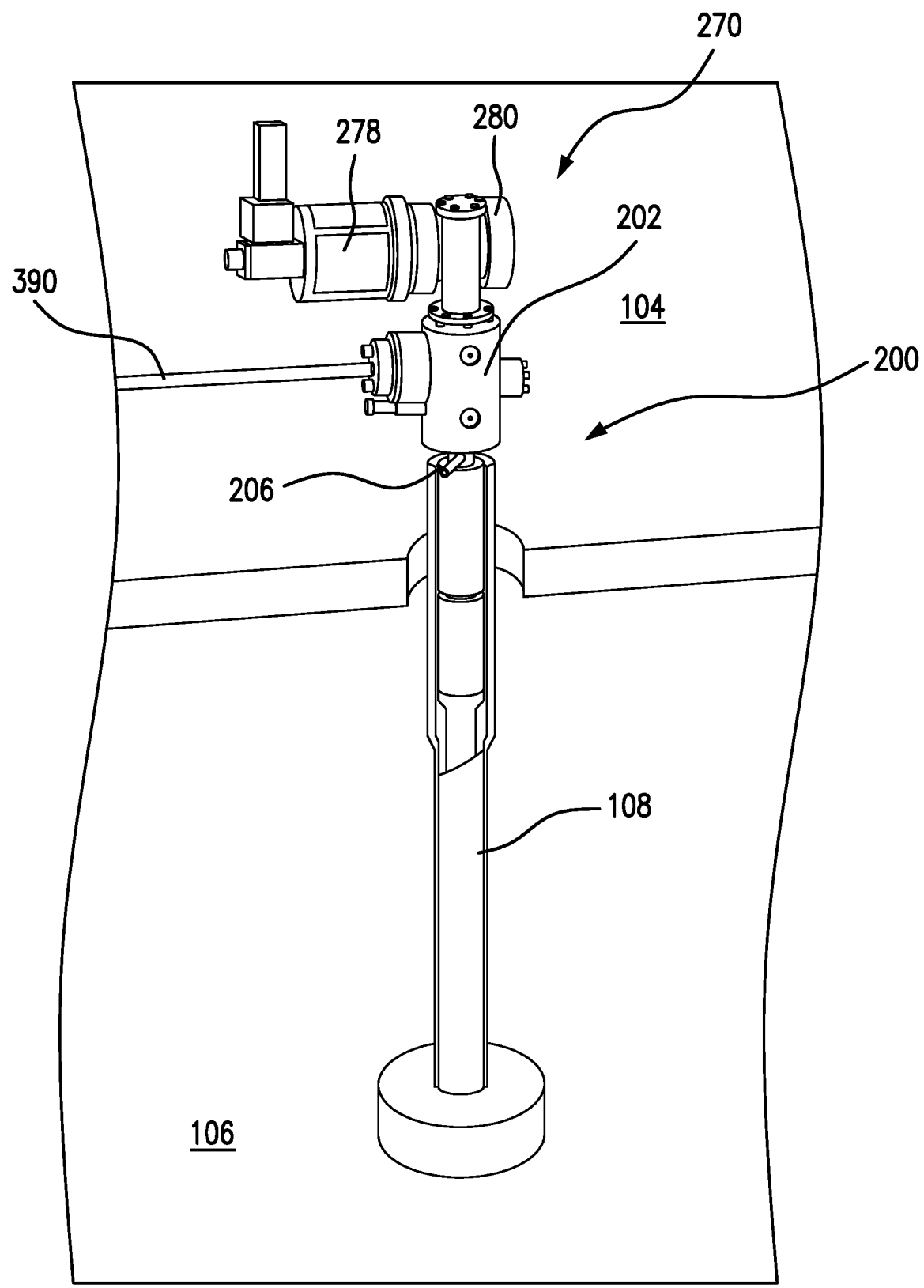
FIGS. 4A and 4B through 4I are perspective and partial cross-sectional views, respectively, of a target elevator assembly of the target irradiation system shown in FIG. 1.

As best shown in FIGS. 1 and 4A, the present target irradiation system 100 preferably includes four target elevator assemblies 200 including body portions 202 composed of stainless steel and target baskets 250 composed of Zirconium alloy (i.e., Zircalloy-4), the target elevator assemblies 200 being vertically inserted into existing penetrations on the reactor's reactivity mechanism deck 104. Preferably, the intended penetrations for mounting of the target elevator assemblies 200 are out-of-service adjustor assembly ports 108, however, in alternate embodiments, target elevator assemblies 200 may be installed in other reactor penetrations that meet the specifications for installation.

Figure 2A:
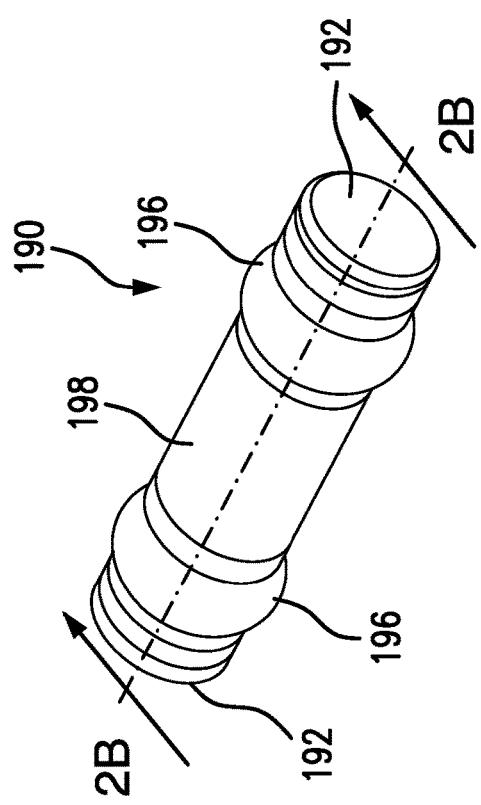
FIGS. 2A and 2B are perspective and cross-sectional views, respectively, of a target capsule of the target irradiation system shown in FIG. 1.
Figure 2B:
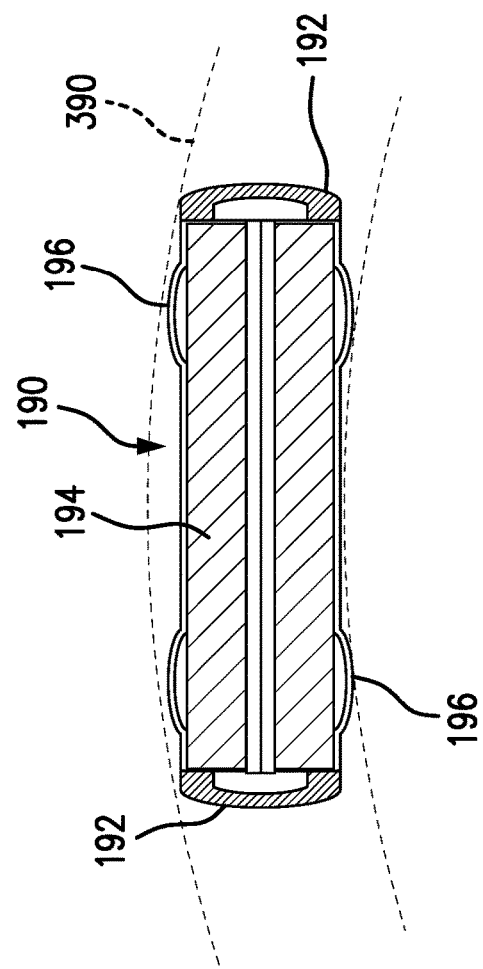

As shown in FIGS. 2A and 2B, target capsules 190 are the delivery vehicles for the radioisotope targets which allow for the separation of materials in an inert environment designed to eliminate corrosion related degradation from exposure to environmental mediums while in the core of the reactor. Target capsule 190 includes a body portion 198 and end caps 192 that are preferably constructed of a commercial grade Zirconium alloy, with other materials such as Titanium-Aluminum-Vanadium (Ti-6A1-4V) being an option. End caps 192 are welded to opposite ends of body portion 198 to provide a leak-tight interior compartment. Target capsule 190 is shaped to maximize flow performance through the pneumatic transfer piping 390. FIGS. 2A and 2B show the capsule design with a preferable target material of natural molybdenum 194 inside, although enriched molybdenum may be used as well. In order to ensure that target capsule 190 is secure prior to use in the reactor and to maintain its integrity, a comprehensive leak test and inspection process is utilized during manufacturing. The end cap 192 closure design preferably incorporates features, such as annular bulges 196, to absorb end forces that may be experienced by target capsule 190 to help insure that the welded joints do not degrade or fail because of impact forces during transfer. Note, however, in alternate embodiments of target capsule 190 the annular bulges 196 may not be used. The weld joints, end caps 192, and body portion 198 are preferably designed such that they are not stretched or jammed due to pressures experienced during operation of the system.

Figure 3A:
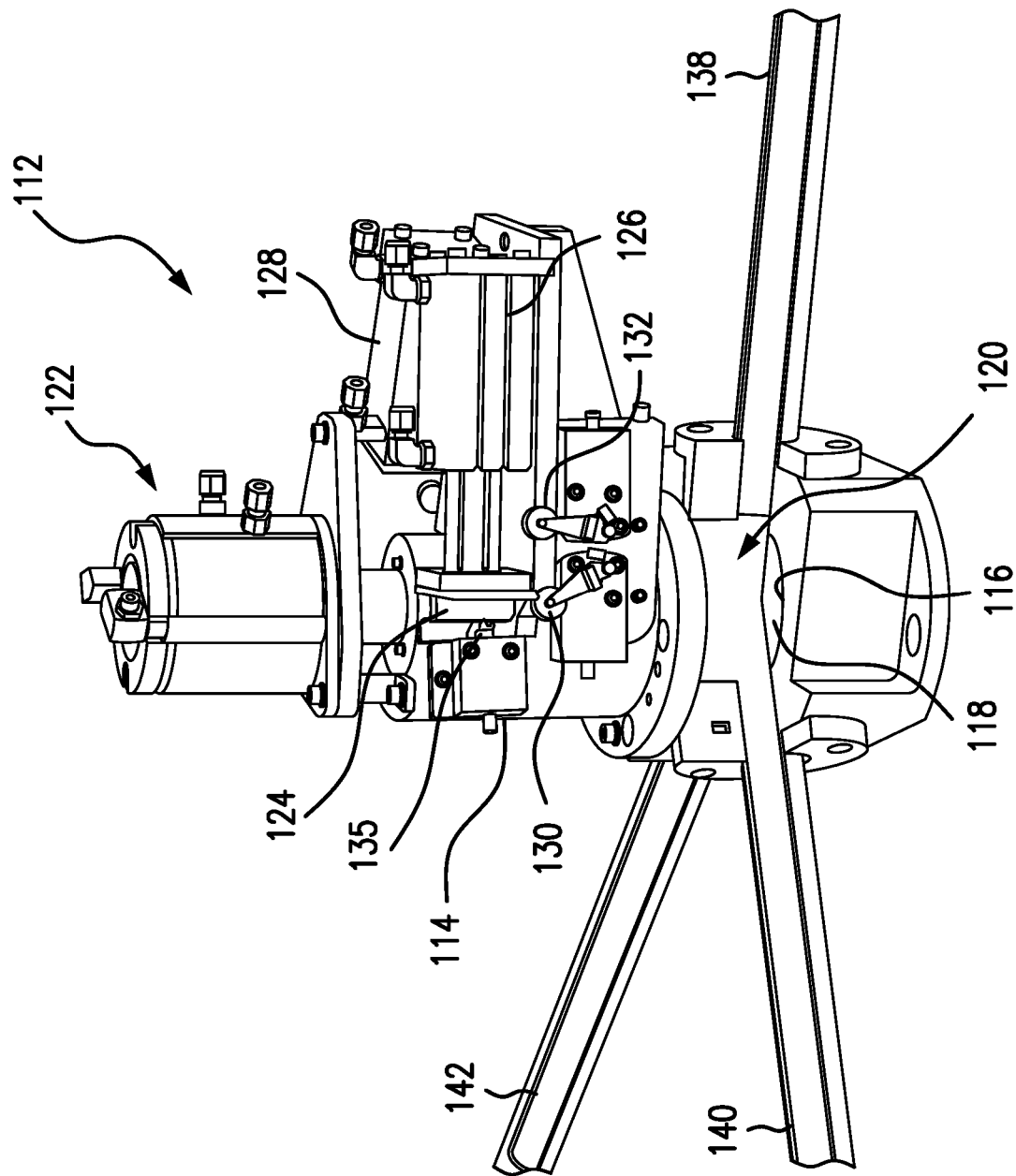

Referring now to FIG. 5A, a target irradiation sequence will be discussed. As shown in FIG. 5A, at the initiation of a target irradiation sequence, all the isolation valves within target irradiation system 100 are in the closed positions. To begin the sequence, an operator first loads a plurality of target capsules 190, eight in the present example, into new target loader 110 and insures that path diverter assembly 112 is configured to receive the new target capsules 190 from new target loader 110. Referring additionally to FIGS. 3A through 3D, diverter assembly 112 includes a body portion 114 that defines an internal cavity 116 that is configured to rotatably receive cylindrical drum 118. Cylindrical drum 118 defines a curved passage 120 therethrough that is configured to align either the first inlet pipe 140 or the second inlet pipe 142 with outlet pipe 138, wherein first inlet pipe 140 connects new target loader 110 to diverter assembly 112 and second inlet pipe 142 connects flask loader 300 to diverter assembly 112. A motor 122 is connected to cylindrical drum 118 by a shaft and is configured to rotate cylindrical drum 118 between two positions. As shown in FIG. 3A, a lock paddle 124 extends radially-outwardly from the shaft and indicates which of the first and second inlet pipes 140 and 142 is aligned with outlet pipe 138.

Figure 3B:
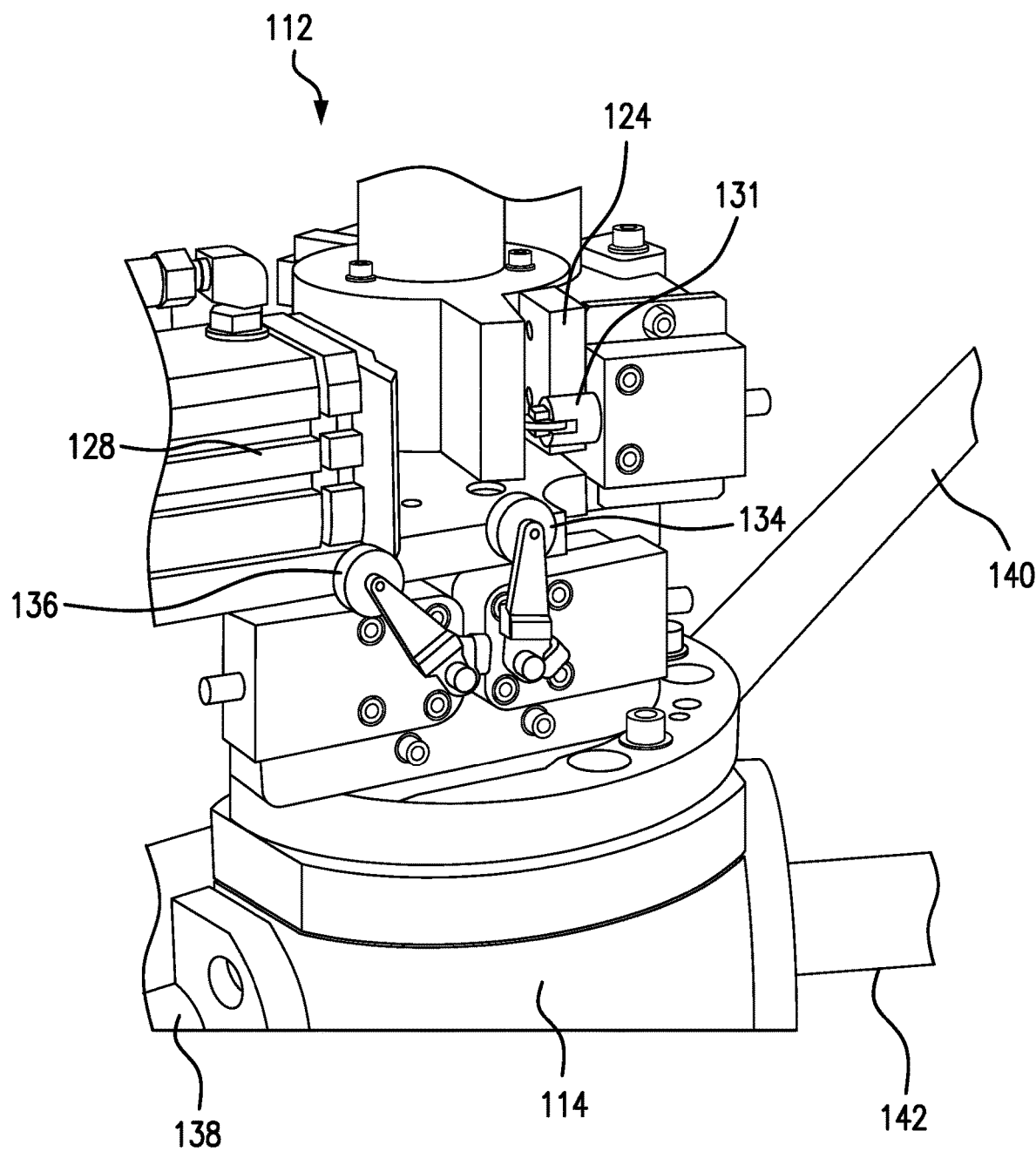
Figure 3C:
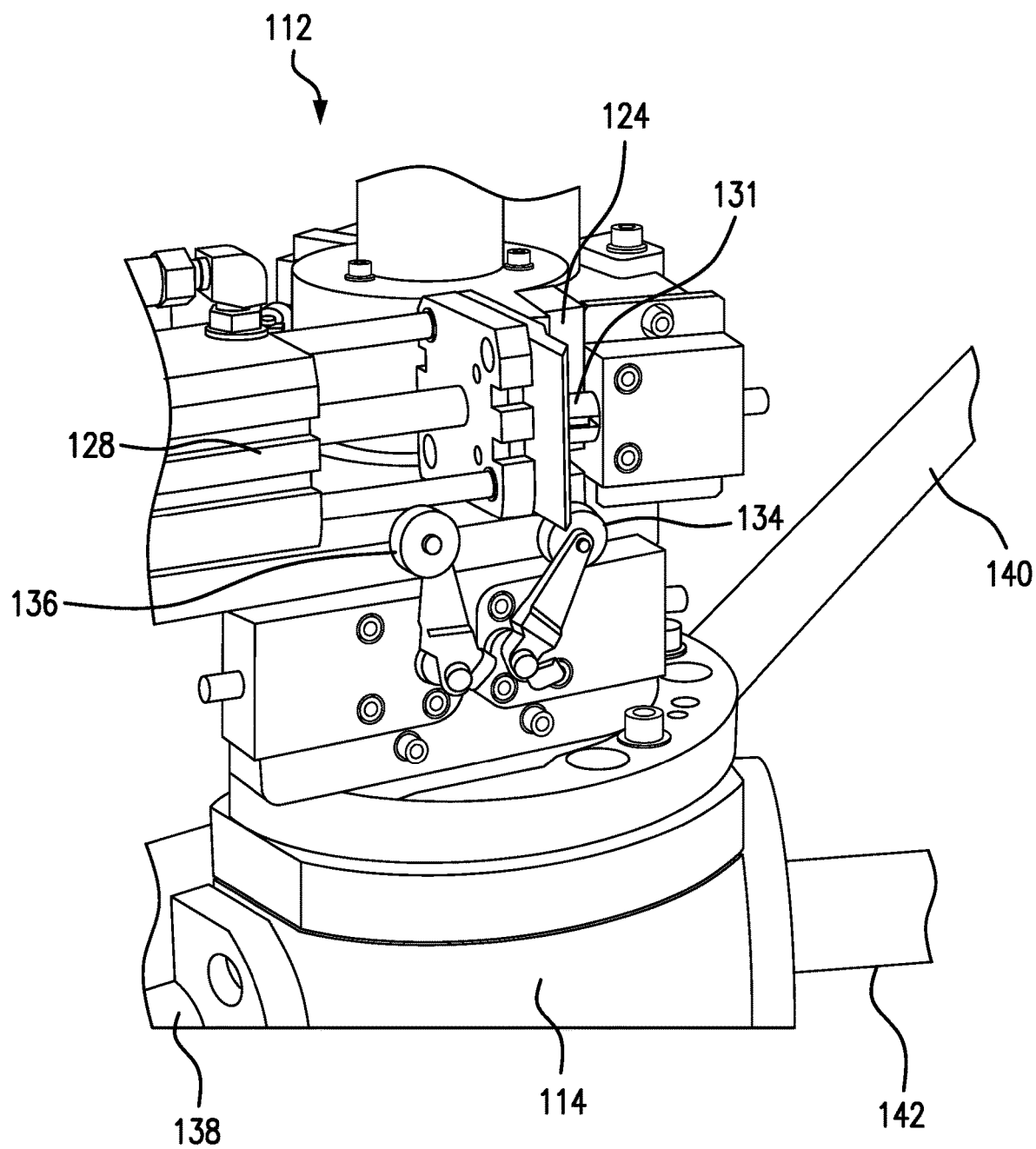

A pair of first and second lock rams 126 and 128 is provided for securing lock paddle 124 and, therefore, passage 120 in either a first position aligned with first inlet pipe 140 or a second position aligned with second inlet pipe 142, respectively. A pair of first and second lock switches 130 and 132 provides an indication as to whether first lock ram 126 is fully extended, thereby positively securing drum 118 and passage 120 in alignment with first inlet pipe 140, or whether first lock ram 126 is fully retracted so that motor 122 may be used to rotate drum 118 and passage 120 to the second position in which they are aligned with second inlet pipe 142. Referring specifically to FIGS. 3B and 3C, the position of lock paddle 124 now indicates that drum 118 has been rotated to the second position so that passage 120 now aligns second inlet pipe 142 with outlet pipe 138. Once closure switch 131 provides an indication that lock paddle 124 has been rotated to the second position, second lock ram 128 is fully extended, thereby engaging lock paddle 124 and positively securing passage 120 in proper alignment with second inlet pipe 142. As with first lock ram 126, a pair of first and second lock switches 134 and 136 is provided to indicate the position of second lock ram 128.

Referring now to FIG. 5B, after verification that diverter assembly 112 is aligned with new target loader 110, a string of eight target capsules 190 is propelled to airlock 150 by pneumatic force. Airlock 150 is defined by the section of transfer piping 390 disposed between first and second outboard isolation valves 152 and 154, respectively, and a pair of first and second inboard isolation valves 156 and 158, respectively. As shown in FIG. 5B, during transfer of target capsules 190 to airlock 150, first and second outboard isolation valves 152 and 154 are opened whereas first and second inboard isolation valves 156 and 158 remain closed. A propellant air flow is applied to the string of target capsules 190 at new target loader 110 and an arresting air flow is provided through air inlet pipe 168 by opening air isolation valve 170. The arresting air flow is provided to slow the string of target capsules 190 as they enter airlock 150, thereby helping to prevent any potential damage due to impact. Upon the initiation of the propellant and arresting flows, exhaust isolation valve 166 is placed in the open position so that the combined flows may exit airlock 150 by way of exhaust pipe 164.

Referring additionally to FIG. 5C, first, second, and third stop pistons 172, 174, and 176, respectively, are selectively extendable into, and retractable from, airlock 150 in order to properly position the string of target capsules 190. As shown in FIG. 5C, when inserting a new string of target capsules 190 into airlock 150, only third stop piston 176 extends into airlock 150 so that the string of target capsules 190 is properly positioned within the airlock 150. As shown in FIG. 5D, once the string of target capsules 190 is positioned within airlock 150, first and second outboard isolation valves 152 and 154 are moved to the closed position so that airlock 150 is isolated from external environment of target irradiation system 100. Prior to the step of delivering the string of target capsules 190 to a corresponding target elevator assembly 200, airlock 150 and, therefore, the string of target capsules 190 is purged with helium through helium inlet 160 by placing helium isolation valve 162 in the open position. Similarly to the propulsion and arresting air flows, helium from the purge exits airlock 150 by way of exhaust pipe 164. Once the helium purge is secured, exhaust isolation valve 166 is placed in the closed position.

Referring now to FIG. 5E, prior to transferring the string of target capsules 190 out of airlock 150, the operator insures that target elevator diverters 180 are configured to be in fluid communication with the desired target elevator assembly 200. In the preferred embodiment shown, three target elevator diverters 180 are utilized since the present embodiment includes four target elevator assemblies 200. If an alternate embodiment were only two target elevator assemblies 200 are utilized, only one target elevator diverter 180 would be required. Target elevator diverters function identically to the previously discussed path diverter assembly 112, so a repeat discussion is not provided.

Referring now to FIG. 5F, once target elevator diverters 180 are aligned with the proper target elevator assembly 200, a propellant flow for the string of target capsules 190 is created by activating first pneumatic pump 360 and placing inboard isolation valve 364 of outlet pipe 362 in the open position. As with airlock 150, an arresting flow for the string of target capsules 190 is provided by activating second pneumatic pump 370 and opening outlet isolation valve 374 of outlet pipe 372. Simultaneous with the initiation of the propellant and arresting flows, an exhaust line for the two flows is provided by opening inlet isolation valve 378 of inlet pipe 376 of second pneumatic pump 370 so that the flows are recirculated back to the inlets of first and second pneumatic pumps 360 and 370 through inlet pipe 376. With the propellant, arrest, and exhaust flows established, third stop piston 176 is retracted from within airlock 150 and the string of target capsules 190 is propelled through transfer piping 390 to the corresponding target elevator assembly 200. As best in FIG. 5F, the arresting flow is configured to flow upwardly through target elevator assembly 200 so that the string of target capsules 190 is slowed as it begins to enter target elevator assembly 200. The arresting flow may be selected to be forceful enough to suspend the string of target capsules 190 as they enter target elevators assembly 200. By slightly reducing the level of the arresting flow, the string of target capsules 190 may be greatly lowered to the bottom of target basket 250. Additional outlet and inlet piping, along with corresponding isolation valves, is provided so that outlet pipe 372 and inlet pipe 376 of second pneumatic pump 370 may be aligned with each of the target elevator assemblies 200.

Note, an alternate embodiment of the present system may include first and second hydraulic pumps rather than first and second pneumatic pumps 360 and 370 so that liquids may be used as the propellant and arresting flows for delivery of the string of target capsules 190 to target elevator assembly 200. When liquids are used for the propellant and arresting flows, isolation valves are utilized on the portions of outlet pipe 372 and transfer piping 380 closest to target elevator assembly 200 in order to minimize the amount of fluid that is released into the calandria as target basket 250 is lowered therein. Preferably, the liquid used in such an embodiment is reactor grade water, specifically heavy water when the reactor utilized is a CANDU reactor. Additionally, when liquids are used for target capsule 190 transfer, a drain is provided on airlock 150 for the movement from a liquid to an air environment.

Figure 4B:
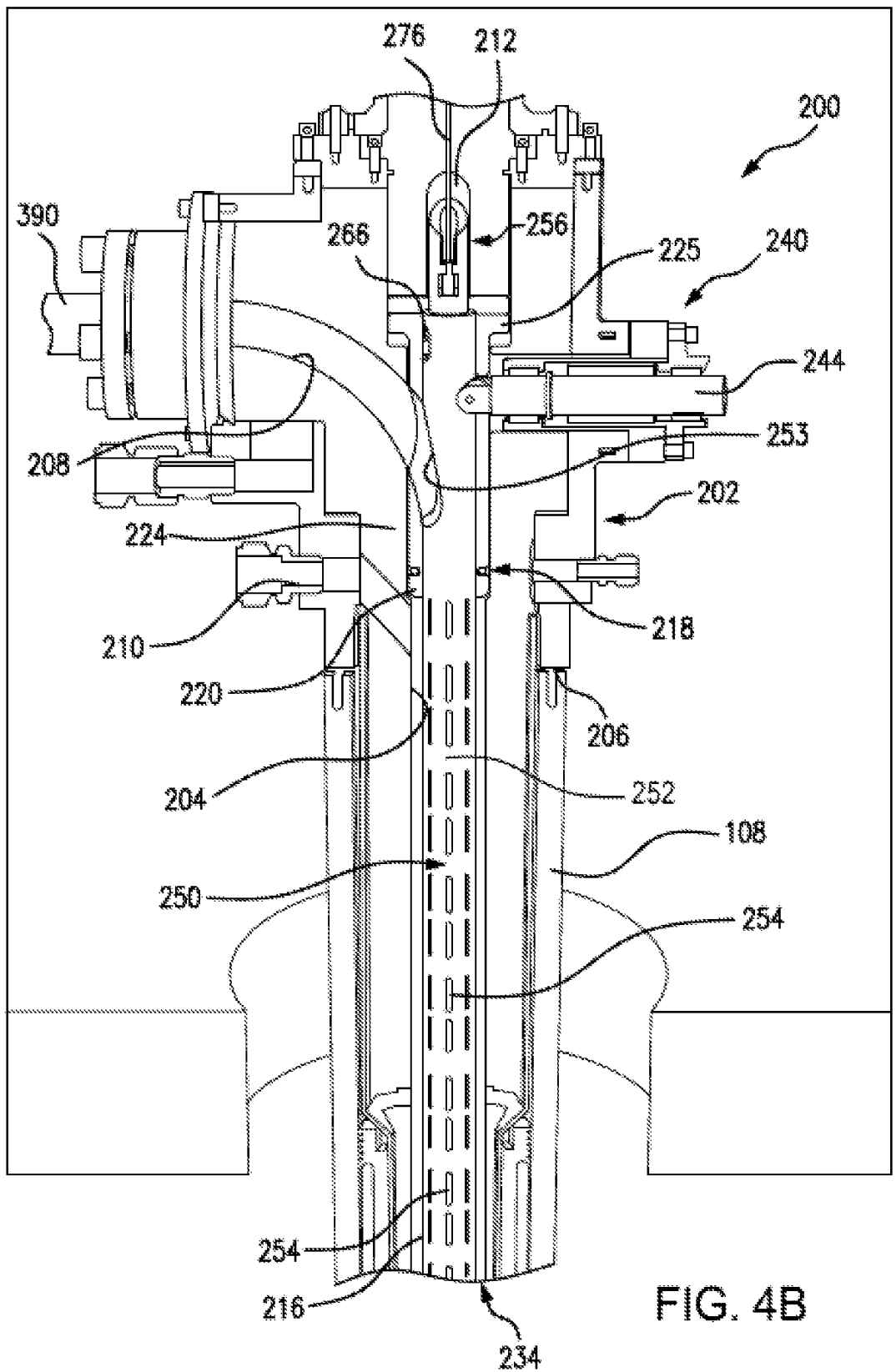

Referring now to FIGS. 4A and 4B, each target elevator assembly 200 of target irradiation system 100 is mounted to a corresponding adjustor assembly port 108, or thimble, that is accessible from above the reactivity mechanism deck 104 and extends downwardly into calandria 106 of the CANDU reactor. As best seen in FIG. 4B, target elevator assembly 200 includes an elongated body portion 202 that defines a central bore 204 and includes a mounting flange 206 that affixes target elevator assembly 200 to the top portion of adjustor assembly port 108. A curved target passage 208 is formed in the upper end of body portion 202 and extends from transfer piping 390 to central bore 204. Similarly, the upper end of body portion 202 defines a pneumatic passage 210 that is in fluid communication with both outlet pipe 372 of second pneumatic pump 370 and central bore 204. As best seen in FIGS. 4E and 4H, the bottom portion of central bore 204 includes a frustoconically-shaped entrance surface 214 that is configured to facilitate slidably receiving a corresponding target basket 250.

Figure 4C:
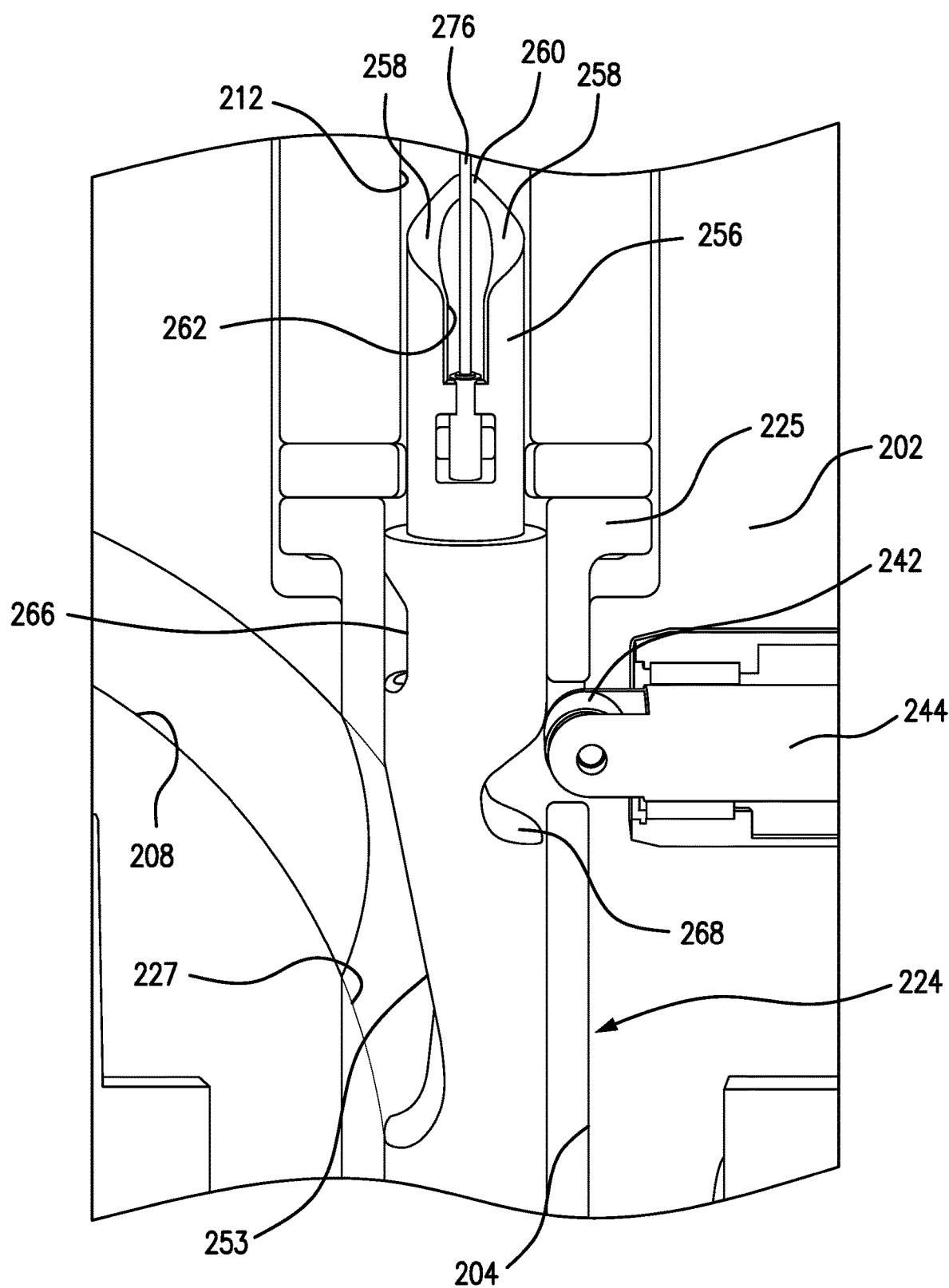

A cylindrical center tube 216 is mounted within central bore 204 of target elevator assembly 200 by way of a flange 225 that extends radially-outwardly from an uppermost end of the tube's upper body portion 224, as best seen in FIGS. 4B and 4C. As shown in FIG. 4B, center tube 216 includes an annular ring 220 affixed to its uppermost portion, the annular ring 220 being secured to upper body portion 224 by bellows 218, or in the alternative a spring set. As discussed in greater detail below, bellows 218 allow center tube 216 to be limitedly slidable with respect to body portion 202 of target elevator assembly 200. As best seen in FIG. 4H, bottom end 222 of center tube 216 includes a bottom bushing 228, an outer surface of which forms a seal with an inner surface of the elevator assembly's central bore 204 and a frustoconically-shaped inner surface 232 that is configured to form a seal with a corresponding frustoconically-shaped surface of a bottom flange 267 of target basket 250. A plurality of flow apertures 226 is provided at bottom end 222 of center tube 216 adjacent bottom bushing 228. Flow apertures 226 provide fluid communication between the interior of center tube 216 and a flow annulus 234 that is defined between the outer surface of center tube 216 and the inner surface of central bore 204 when target basket 250 is fully seated within target elevator assembly 200 (FIG. 4B).

Referring again to FIGS. 4B and 4C, target elevator assembly 200 includes target basket 250 that is slidably received within center tube 216. Target basket 250 includes a cylindrical sidewall 252 that defines a plurality of flow apertures 254, as well as a target aperture 253 at its upper end. When target basket 250 is fully seated within target elevator assembly 200, target aperture 253 is aligned with target passage 208 of body portion 202. Target aperture 253 forms a continuous curved guide with both target aperture 227 of center tube 216 and target passage 208 of body portion 202 so that the string of target capsules 109 may slide freely into target basket 250. As best seen in FIG. 4C, target basket 250 includes a nose 256 extending upwardly therefrom that is defined by two curved camming surfaces 258 that meet at an apex 260 at their upper ends. An alignment slot 262 is disposed between the lower ends of camming surfaces 258 and is configured to slidably receive an alignment pin 264 (FIGS. 4F and 4G) that extends radially-inwardly into a recess 212 at the top of central bore 202 that is configured to receive nose 256 of target basket 250. The upper portion of target basket 250 also defines an alignment flat 266 and lock recess 268 that are configured to receive a roller 242 disposed at the innermost end of piston 244 of lock pin assembly 240, as discussed in greater detail below.

Figure 4D:
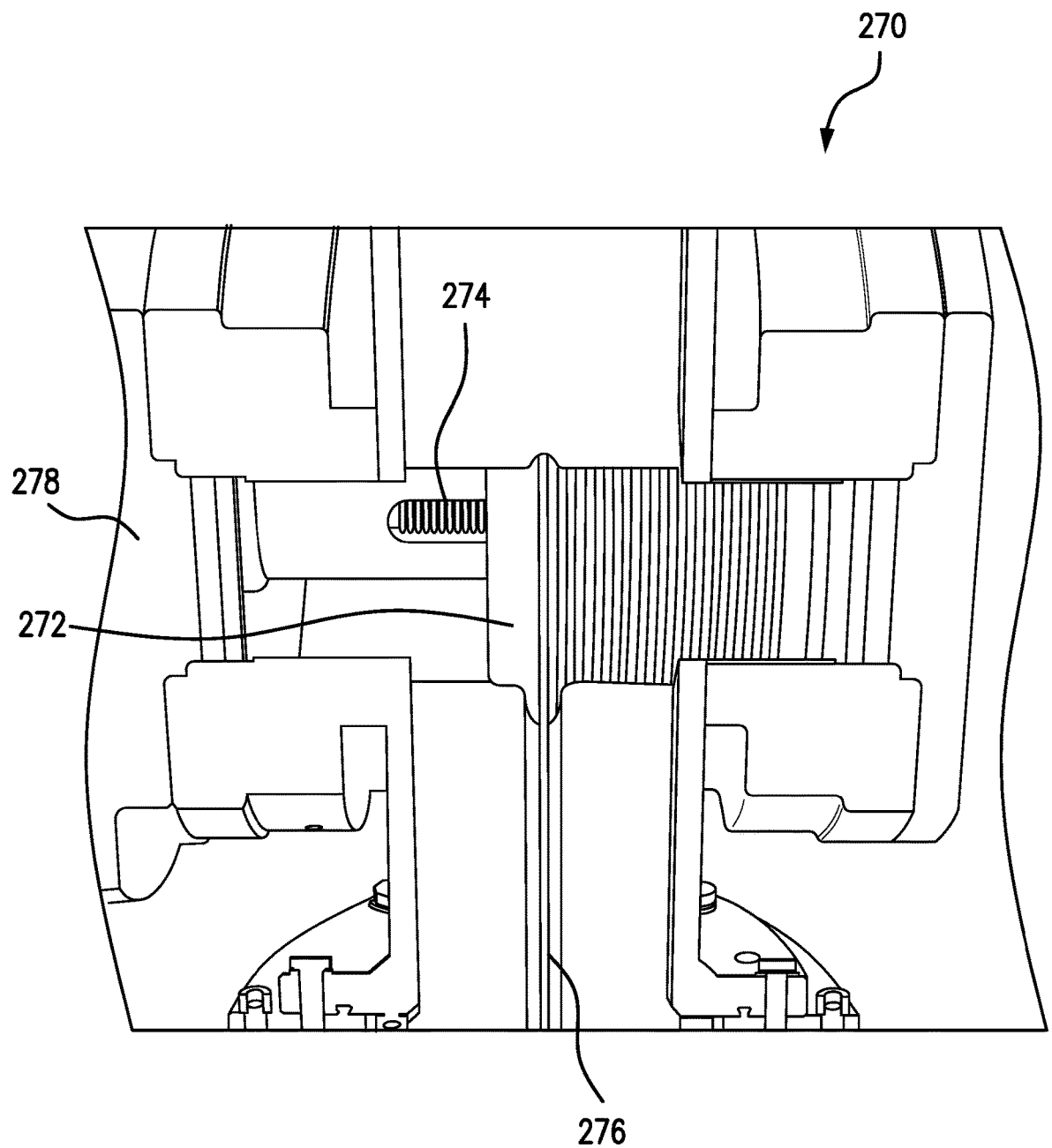
Figure 4E:
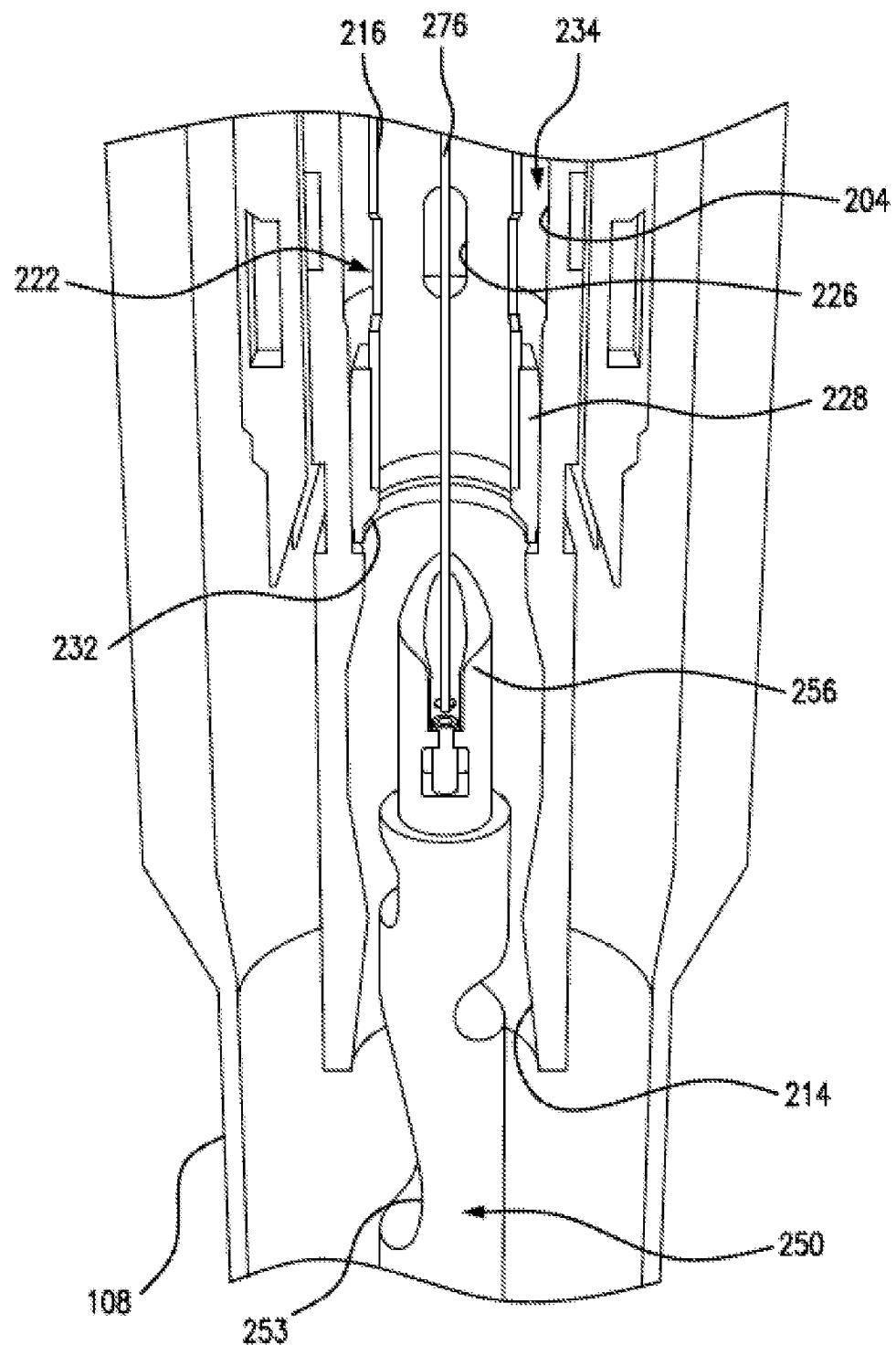

As best seen in FIGS. 4A and 4D, a mechanical cable drive assembly 270 is mounted at the uppermost end of body portion 202 of target elevator assembly 200 and is configured to lower and raise target basket 250. Cable drive assembly 270 includes a drum 272 that is rotatably received on drive screw 274 and a drive motor 278 disposed within housing 280. Feed wire 276 is rotatably received about drum 272 and its bottom end is affixed to the upper end of target basket 250. Drum 272 is configured to progress along its mounting shaft as feed wire 276 is both spooled and unspooled so that feed wire 276 remains on center with target basket 250. Preferably, drum 272 is received on a cantilevered mounting shaft including a force sensor at the end so that it is capable of determining when a full target string has been received within target basket 250 based on the detected weight. As well, the cantilevered drum 272 is able to determine when the target basket 250 and corresponding string of target capsules 190 are positioned either within or above the moderator within calandria 106 of the reactor based on the supported weight. Additionally, the force sensor detects jams and loss of tension on the feed wire 276 so that motor 278 may be strapped to avoid damage.

Figure 4F:
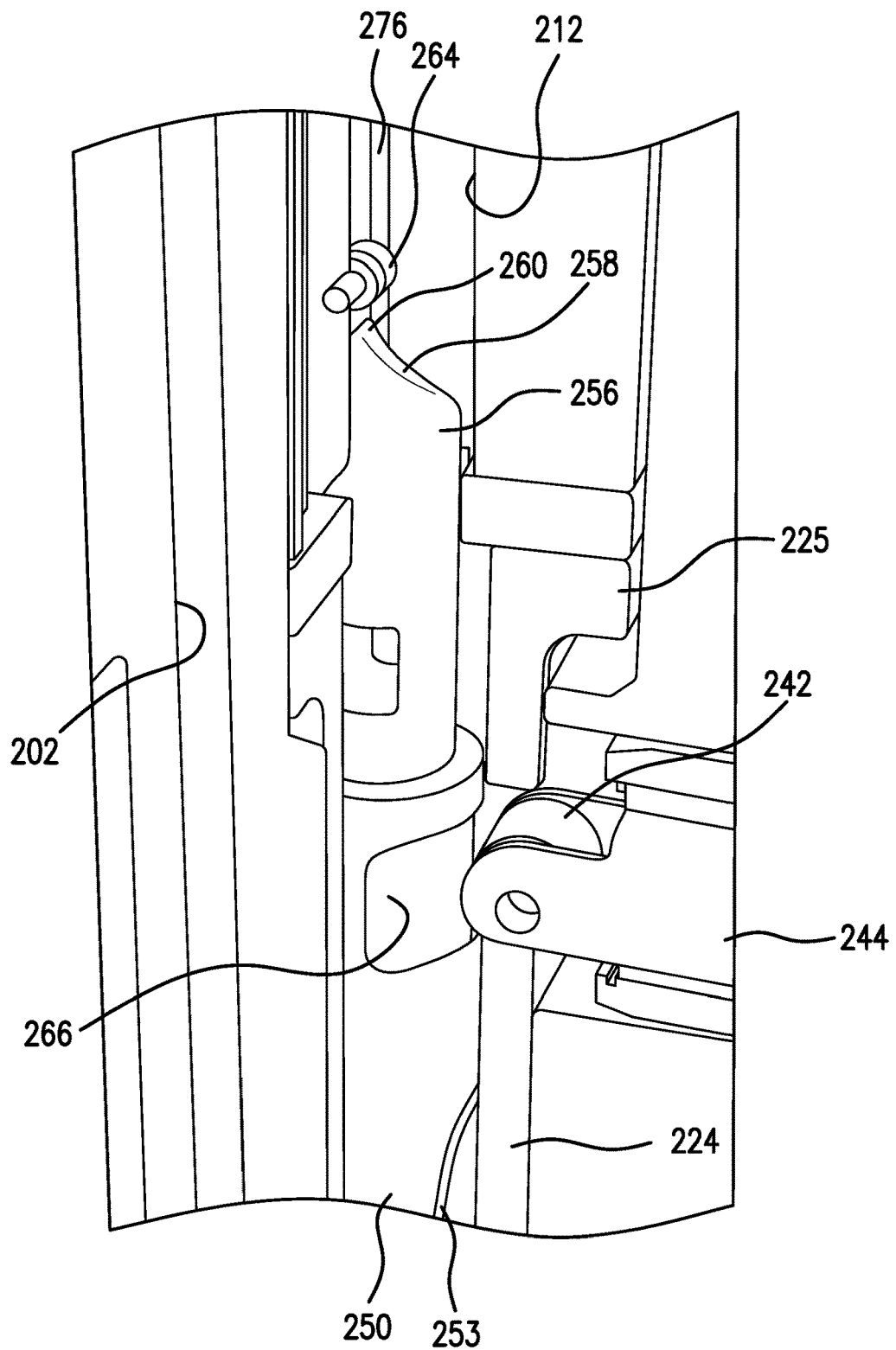
Figure 4G:
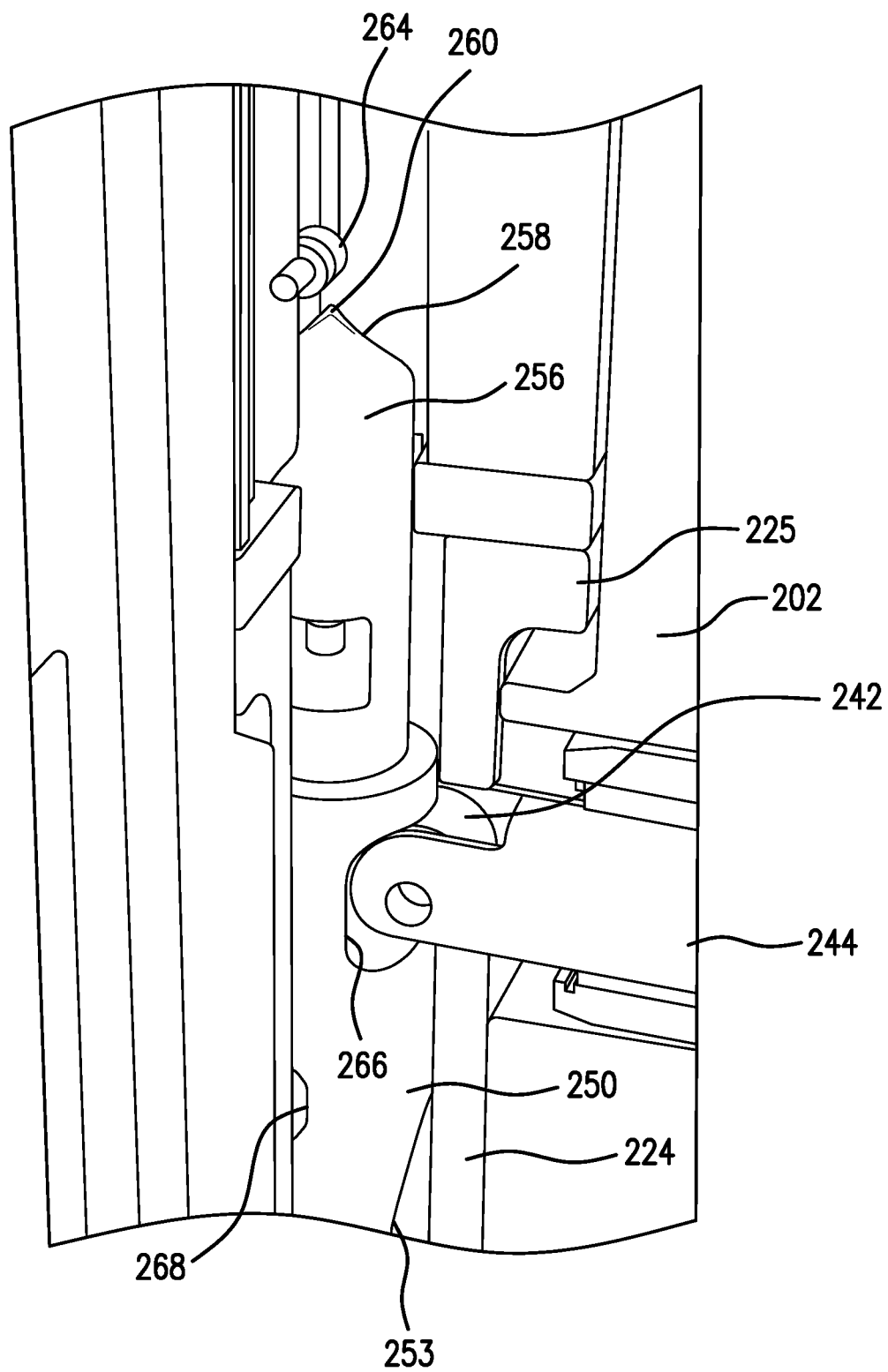
Figure 4H:
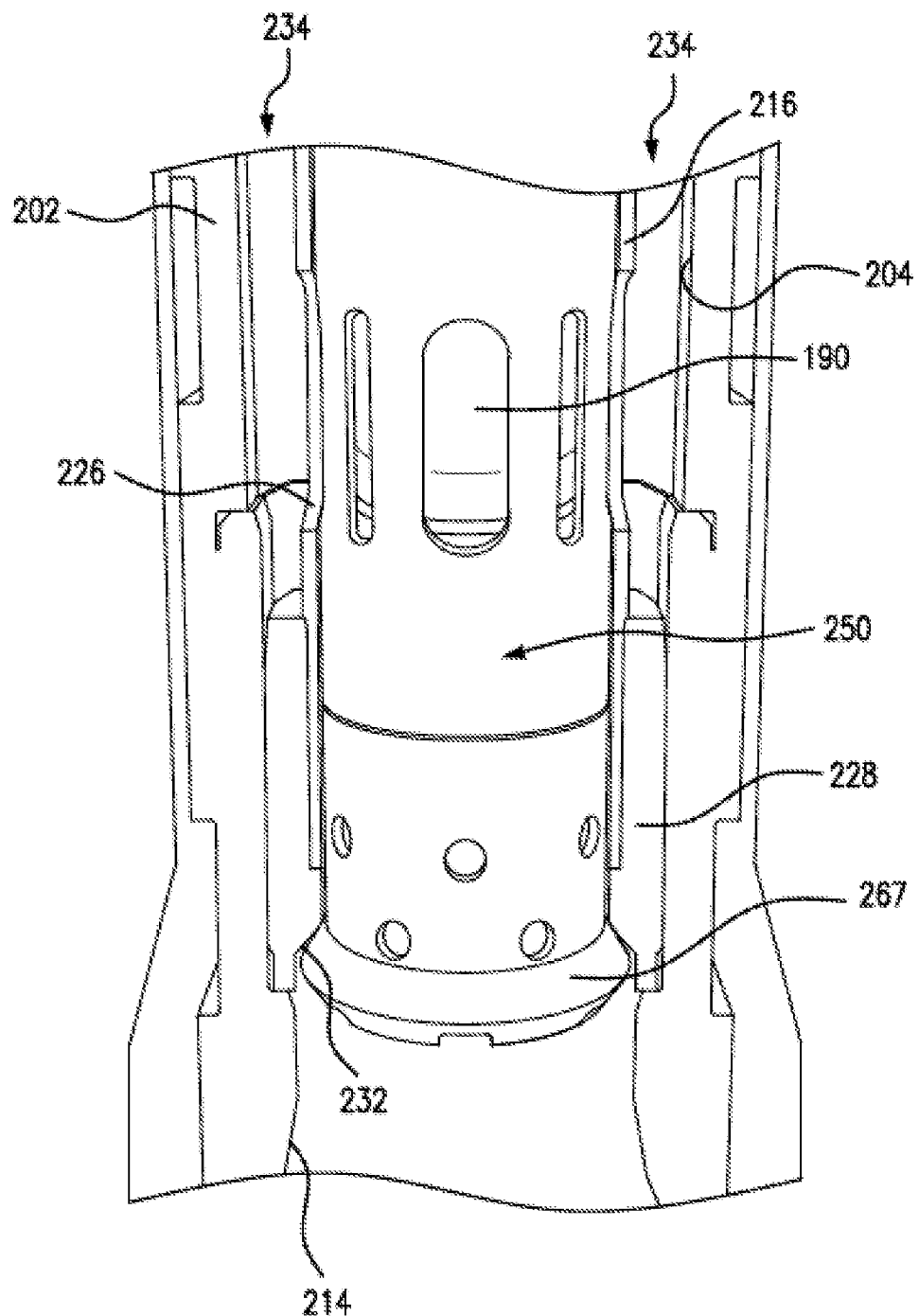
Figure 4I:
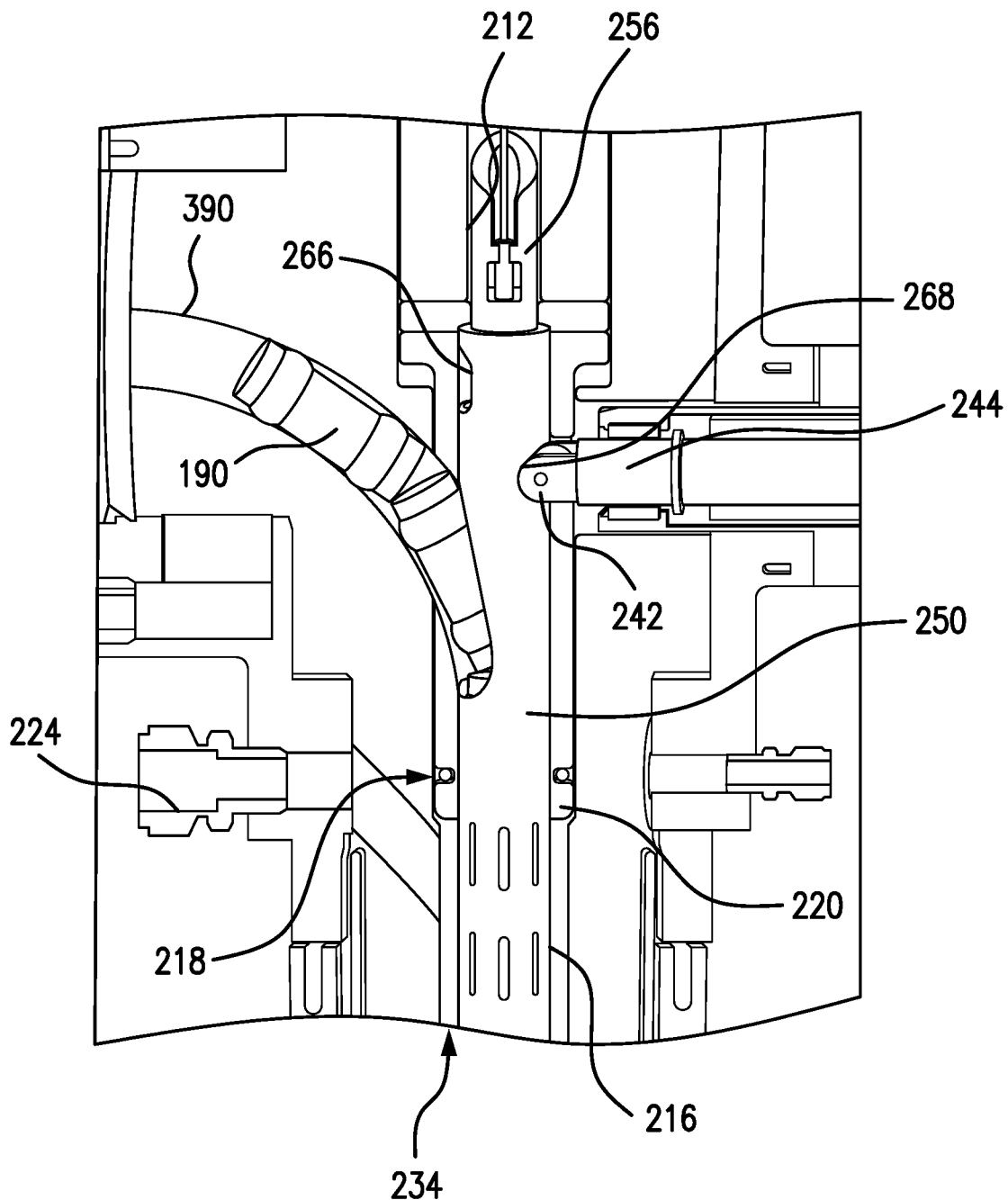

Referring now to FIGS. 5F, 4B, and 4I, as previously discussed, as the target string 190 enters target elevator assembly 200 an arresting flow is provided by second pneumatic pump 370. The arresting flow enters target elevator assembly 200 through pneumatic passage 210 and flows downwardly through flow annulus 234 until it reaches flow apertures 226 formed in bottom end 222 of center tube 216. Further downward flow is prevented by bottom bushing 228 of center tube 216 which forms an airtight seal with both central bore 204 of body portion 202 and bottom flange 267 of target basket 250, as shown in FIG. 4H. At this point, the arresting flow enters the interior of center tube 216 through flow apertures 226 and flows upwardly, at which point the flow encounters the target capsules 190, until exiting transfer tubing 390 by way of exhaust line 376.

As shown in FIG. 4I, the string of target capsules 190 is only inserted into target basket 250 when target basket 250 is fully seated within target elevator assembly 200 and locked in place by lock pin assembly 240. Roller 242 of piston 244 is only able to engage lock recess 268 of target basket 250 when nose 256 of target basket 250 is fully received within recess 212 of target elevator assembly 200. The engagement of lock pin assembly 240 with lock recess 268 insures that target aperture 253 of target basket 250 is properly aligned, both vertically and rotationally, with target passage 208 and also helps to reduce stress on the connection between feed wire 276 and target basket 250 as lock pin assembly 240 provides support as the string of target capsules 190 impacts the bottom of target basket 250. As shown in FIG. 5G, once the string of target capsules 190 has been received within target basket 250, propellant and arresting flows are stopped by deactivating first pneumatic pump 360 and second pneumatic pump 370, respectively, and closing the corresponding inboard isolation valves 364 and 374, respectively, as well as isolation valve 378 of the exhaust line, as shown in FIG. 5G. Referring now to FIGS. 4C and 4D, after the string of target capsules 190 is received within target basket 250, piston 244 is retracted so that roller 242 no longer engages lock recess 268. Motor 278 is used to lower target basket 250 and, therefore, the string of target capsules 190 into the heavy water moderator that is disposed in the calandria 106 of the reactor. The string of target capsules 190 is exposed to a neutron flux of the reactor while disposed within the moderator.

After the string of target capsules 190 has been irradiated for the desired amount of time, motor 278 of cable drive assembly 270 is once again activated to raise target basket 250 out of the moderator. Preferably, target basket 250 is suspended in the gas space above the moderator to allow both drainage of moderator from target basket 250 and allow short half-lived radioiosotopes to decay to acceptable levels before retrieving the string of target capsules 109 from target elevator assembly 200. As shown in FIG. 4E, frustoconical entrance surface 214 at the bottom of target elevator assembly 200 is configured to guide nose 256 of target basket 250 into center tube 216. Cable drive assembly 270 continues to raise target basket 250 until bottom flange 267 of target basket 250 comes into contact with frustoconically-shaped inner surface 232 of bottom bushing 228, as shown in FIG. 4H. In this position, it is possible that target basket 250 is not properly aligned within center tube 216 for the removal of the string of target capsules 190. For example, as shown in FIG. 4F, target basket 250 is approximately 180° out of position. In most cases, by slightly raising target basket 250, alignment pin 264 will come into contact with one of the two camming surfaces 258 of the basket's nose 256, thereby causing target basket 250 to rotate until alignment pin 264 is slidably received in alignment slot 262. When alignment pin 264 is received within alignment slot 262, target basket 250 is properly positioned for the retrieval of the string of target capsules 190. Alignment flat 266 is provided for the sole instance in which apex 260 of the target basket's nose 256 is directly aligned with alignment pin 264, as shown in FIG. 4F. In this instance, piston 244 of lock pin assembly 240 is extended radially-inwardly until roller 242 engages alignment flat 266, thereby causing a slight rotation of target basket 250 that results in the desired misalignment of apex 260 and alignment pin 264. Note, during this further upward motion of target basket 250, bellows 218 (FIG. 4B) of center tube 216 are compressed. Bellows 218 help to insure that the hard stop 223 (FIG. 4C) that engages the top of target basket 250, and the sealing surfaces 232 and 267 (FIG. 4H), may simultaneously be in contact, thereby allowing for vertical alignment and sealing regardless of manufacturing tolerances between and possible age-related lengthening of the body of target basket 250.

Once the irradiation of the string of target capsules 190 is complete and target basket 250 is fully seated and locked in position within target elevator assembly 200, as shown in FIG. 5G, the removal of the string of target capsules 190 from target elevator assembly 200 is initiated. Referring now to FIG. 5H, removal of the string of target capsules 190 from target assembly 200 is accomplished with a propellant flow from second pneumatic pump 370 and an arresting flow provided by first pneumatic pump 360. Prior to initiation of the propellant and arresting flows, the operator positions first and second airlock inboard isolation valves 156 and 158 to their open positions so that the string of target capsules 190 may enter airlock 150. Upon activation of second pneumatic pump 370, outlet isolation valve 374 is placed in the open position and a propellant flow is provided through outlet pipe 372. Referring additionally to FIG. 4B, propellant flow enters pneumatic passage 210 of target elevator assembly 200 and flows downwardly through flow annulus 234 until it enters the interior of center tube 216 by way of flow apertures 226 (FIG. 4H). At this point, the propellant flow engages the string of target capsules 190, thereby urging the string upwardly and outwardly of target basket 250 and into transfer piping 390, as shown in FIG. 4I. Simultaneous to the initiation of the propellant flow, the arresting flow is initiated by activating first pneumatic pump 360 and placing inboard isolation valve 364 of outlet pipe 362 in the open position. An exhaust flow is not required at this stage in the operation as the propellant and arresting flows are recirculated to the inlets of the first and second pneumatic pumps 360 and 370, respectively, by way of inlet pipe 366 of first pneumatic pump 360. As shown in FIG. 6H, during removal of the string of target capsules 190 from target elevator assembly 200, first stop piston 172 is extended inwardly into the interior of airlock 150 to provide an overshoot stop for the string of target capsules 190 within airlock 150.

Referring additionally to FIG. 6I, once the string of target capsules 190 is properly positioned within airlock 150, airlock 150 is isolated from the remainder of target irradiation system 100 by moving first and second inboard isolation valves 156 and 158 to the closed position. Additionally, the propellant flow, the arresting flow, and the recirculating flow are secured by deactivating the first and second pneumatic pumps 360 and 370, respectively, and positioning isolation valves 364, 368, and 374 in the closed position. Similarly to inserting the string of target capsules 190 into target elevator assembly 200, during the removal of the string of target capsules 190 from target elevator assembly 200 an purge is applied to airlock 150 once the string of target capsules 190 is isolated therein. Because the outbound target capsules 190 are being released to an air environment, an air purge may be utilized rather than a helium purge. The air purge is provided through air inlet 168 by placing air isolation valve 170 in the open position and providing an exhaust flow through exhaust pipe 164 by placing exhaust isolation valve 166 in the open position. Upon completion of the purge, air isolation valve 170 and exhaust isolation valve 166 are placed in the closed position.

Referring now to FIG. 6J, prior to releasing individual target capsules 190 to flask loader assembly 300, an operator insures that path diverter assembly 112 is aligned with second inlet pipe 142 that leads to flask loader assembly 300. Next, a propellant flow is established by placing air isolation valve 170 of air inlet pipe 168 in the open position as well as placing first and second outboard isolation valves 152 and 154 of airlock 150 in the open position. An exhaust flow is provided by flask loader assembly 300, as discussed in greater detail below. Once the propellant flow is established, second stop piston 174 is extended into airlock 150 so that it engages the second target capsule 190 in the string, thereby securing it in position. Next, first stop piston 172 is retracted from the airlock 150 so that the first target capsule 190 of the string is now free to be propelled to flask loader assembly 300. After the release of the first target capsule 190, first stop piston 172 is extended into airlock 150 once again and second stop piston 174 is retracted so that the remaining seven target capsules 190 of the string are free to progress until abutting the first stop piston 172. At this point, second stop piston 174 is extended into airlock 150 until it engages what is now the second target capsule 190 of the remainder of the string. At this point, first stop piston 172 is once again withdrawn from airlock 150, thereby releasing another target capsule for transfer to flask loader assembly 300. This process is repeated until all eight target capsules 190 have been individually released to flask loader assembly 300. Upon completion of the transfer of all eight target capsules 190 to flask loader assembly 300, propellant flow is secured by placing air isolation valve 170 in the closed position and placing first and second outboard isolation valves 152 and 154 of airlock 150 in the closed position, as shown in FIG. 6A.

Figure 6B:
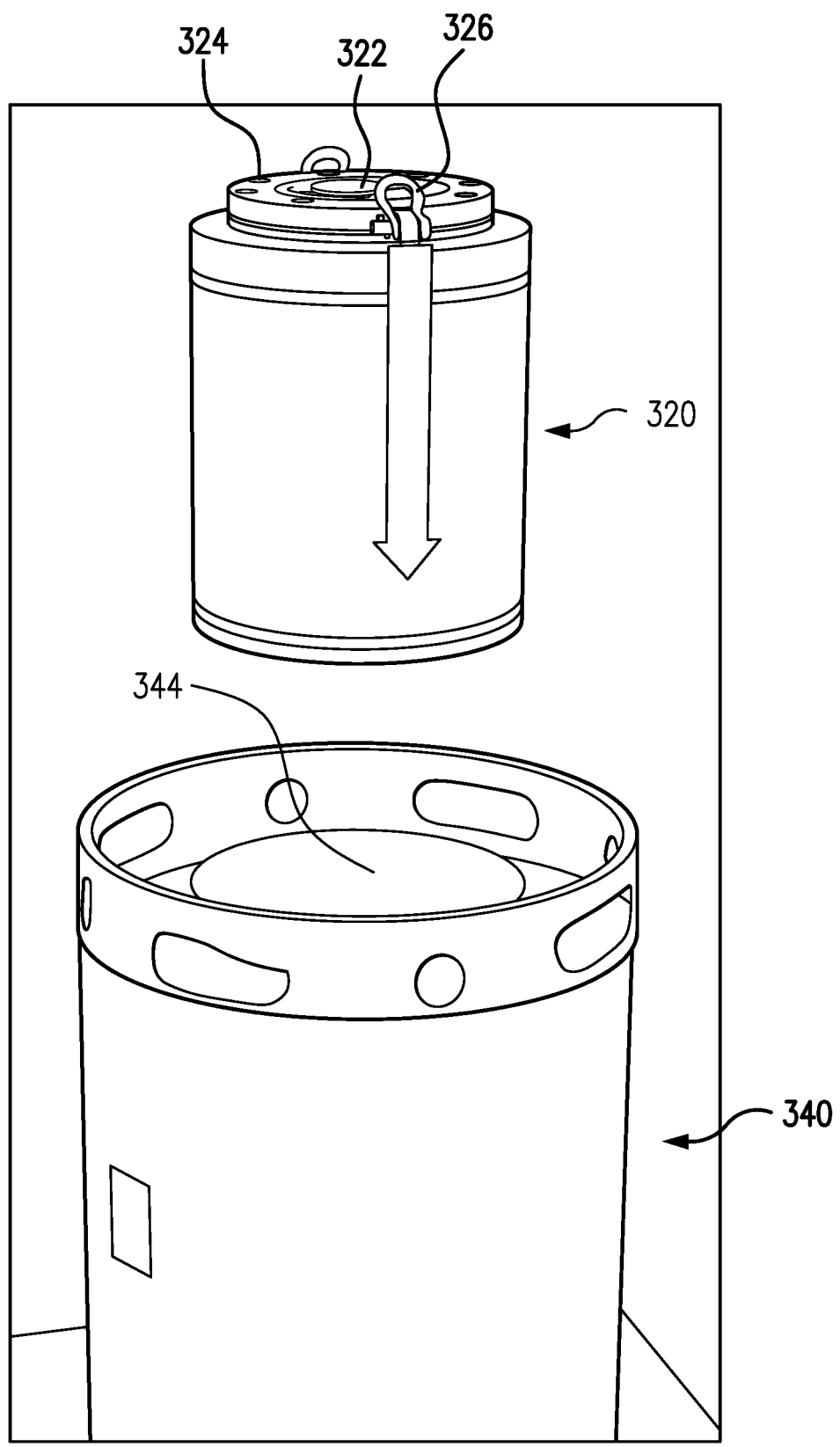
Figure 6C:
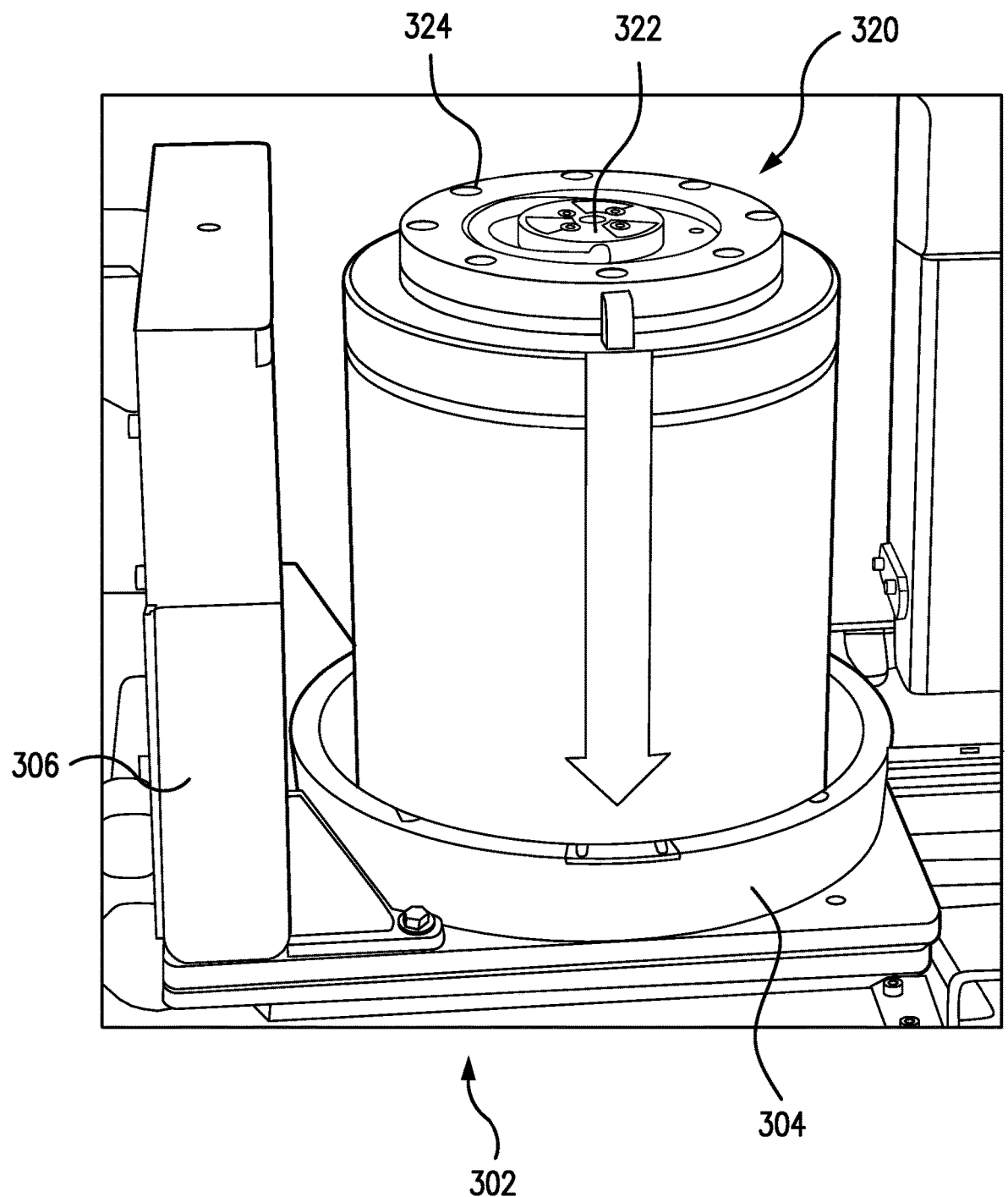
Figure 6D:
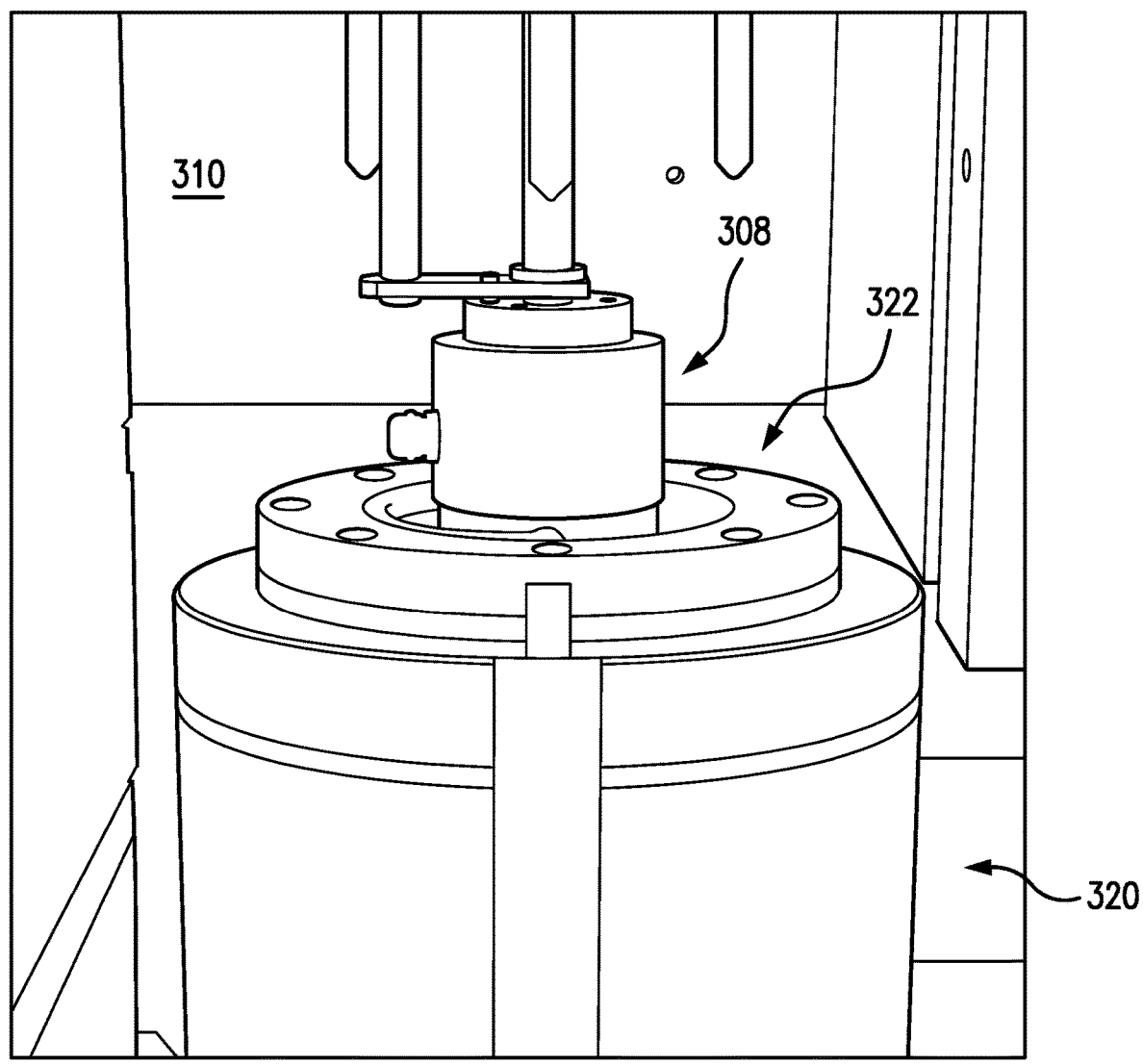

As shown in FIGS. 6A through 6C, flask loader assembly 300 includes a slidable drawer 302 having an annular cradle 304 and an outer door 306. Cradle 304 is configured to receive a flask casket 320 therein, as shown in FIG. 6C. Casket 320 defines an internal cavity 328 (FIG. 5E) that is configured to slidably receive a target flask 330, and includes a closure plug 322 that is secured to the body of casket 320 by plurality of threaded fasteners 324. Closure plug 322 also includes a pair of lift eyes 326 so that casket 320 may be raised and lowered by jib crane 392 (FIG. 1) of the reactor facility. Casket 320 is further received in a road transfer overpack 340 that defines an internal cavity 344 that is enclosable with lid 342. After casket 320 is placed in cradle 304 of drawer 302, threaded fasteners 324 are removed and closure plug 322 remaining in position as drawer 302 is slid inwardly into a first compartment 310 of flask loader assembly 300, as shown in FIG. 6D. Once drawer 302 is slid inwardly so that casket 320 is disposed in first compartment 310, a magnetized plug puller 308 is lowered into contact with closure plug 322 and subsequently raised so that closure plug 322 is removed from casket 320. Note, when casket 320 is received within first compartment 310, door 306 to drawer 302 seals, or partially seals, the interior volume of flask loader assembly 300 from the external environment. Note, some inflow into flask loader assembly 300 may be desired when providing the exhaust flow. As well, exhaust piping 303 is provided so that the interior of flask loader assembly 300 can be subjected to an exhaust flow during the loading of the target capsules 190.

Figure 6E:
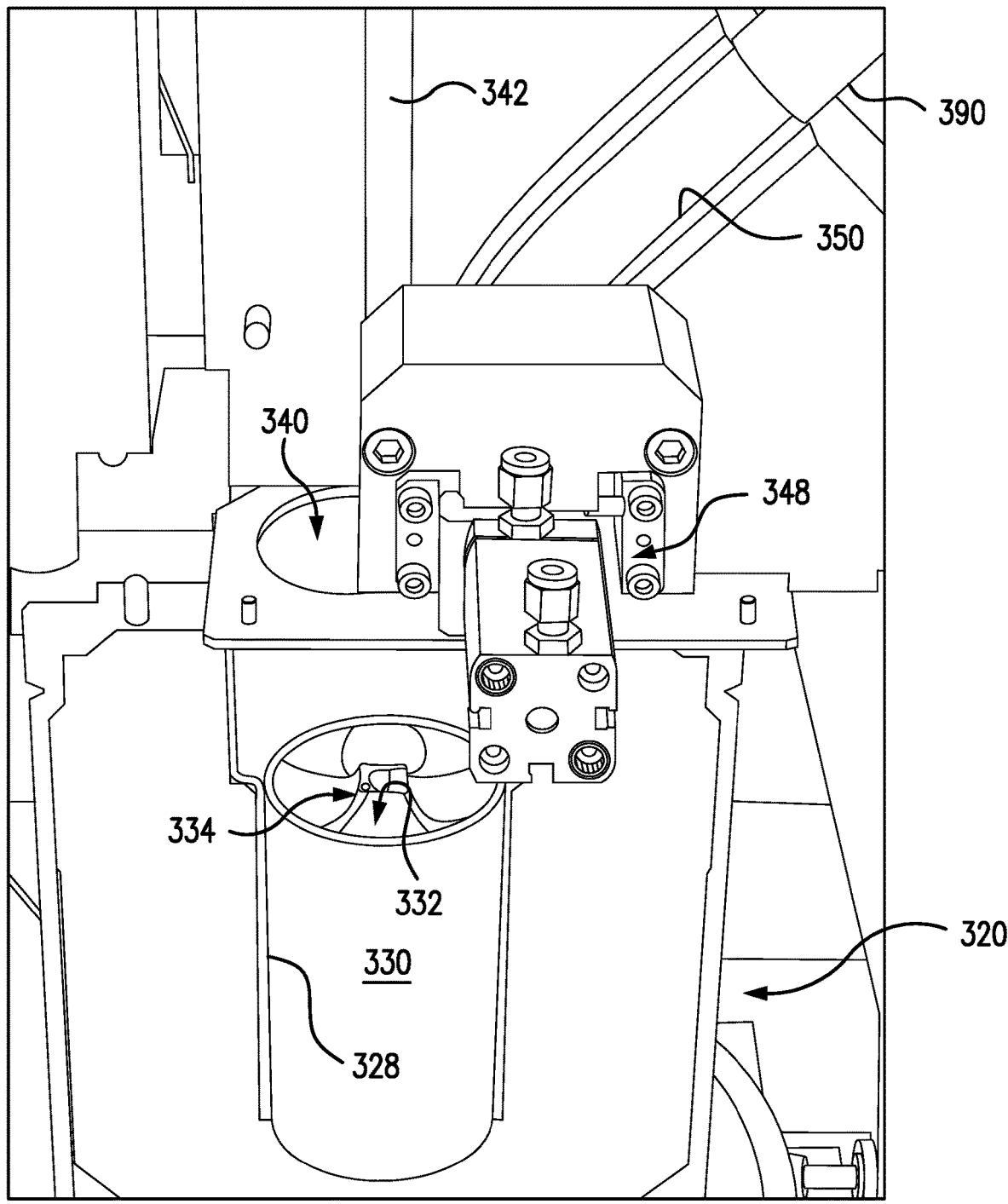
Figure 6F:
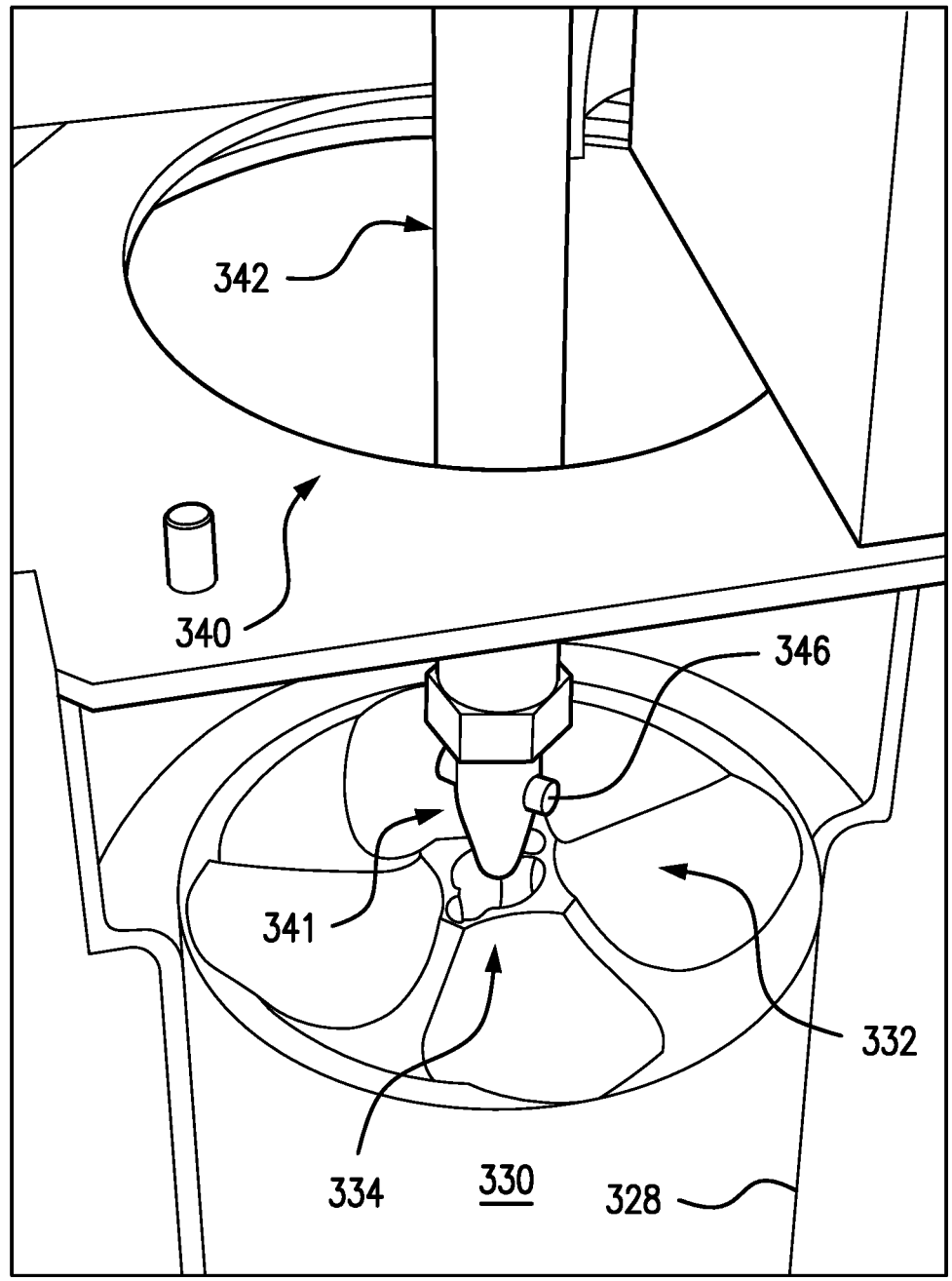
Figure 6G:
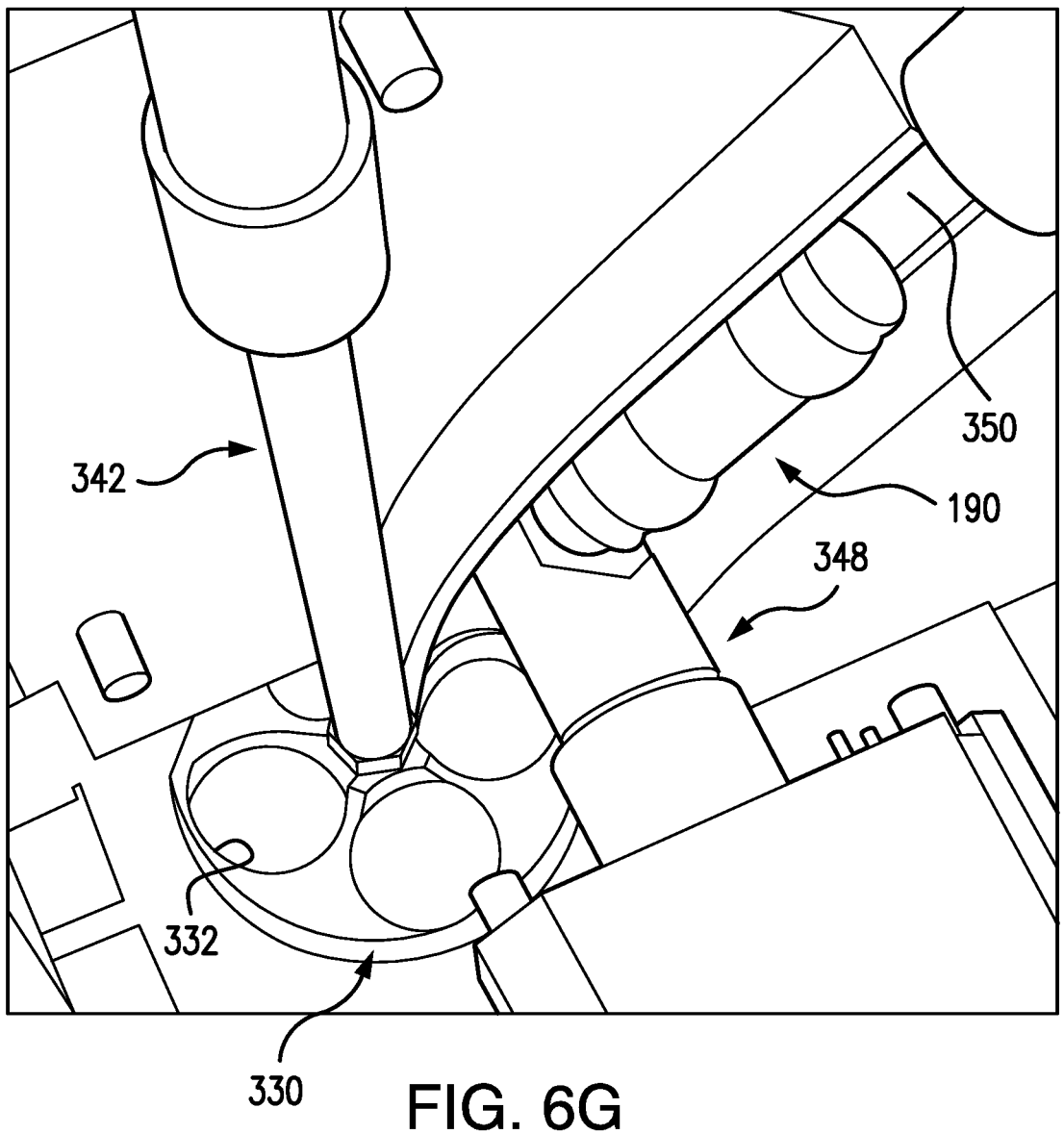
Figure 6H:
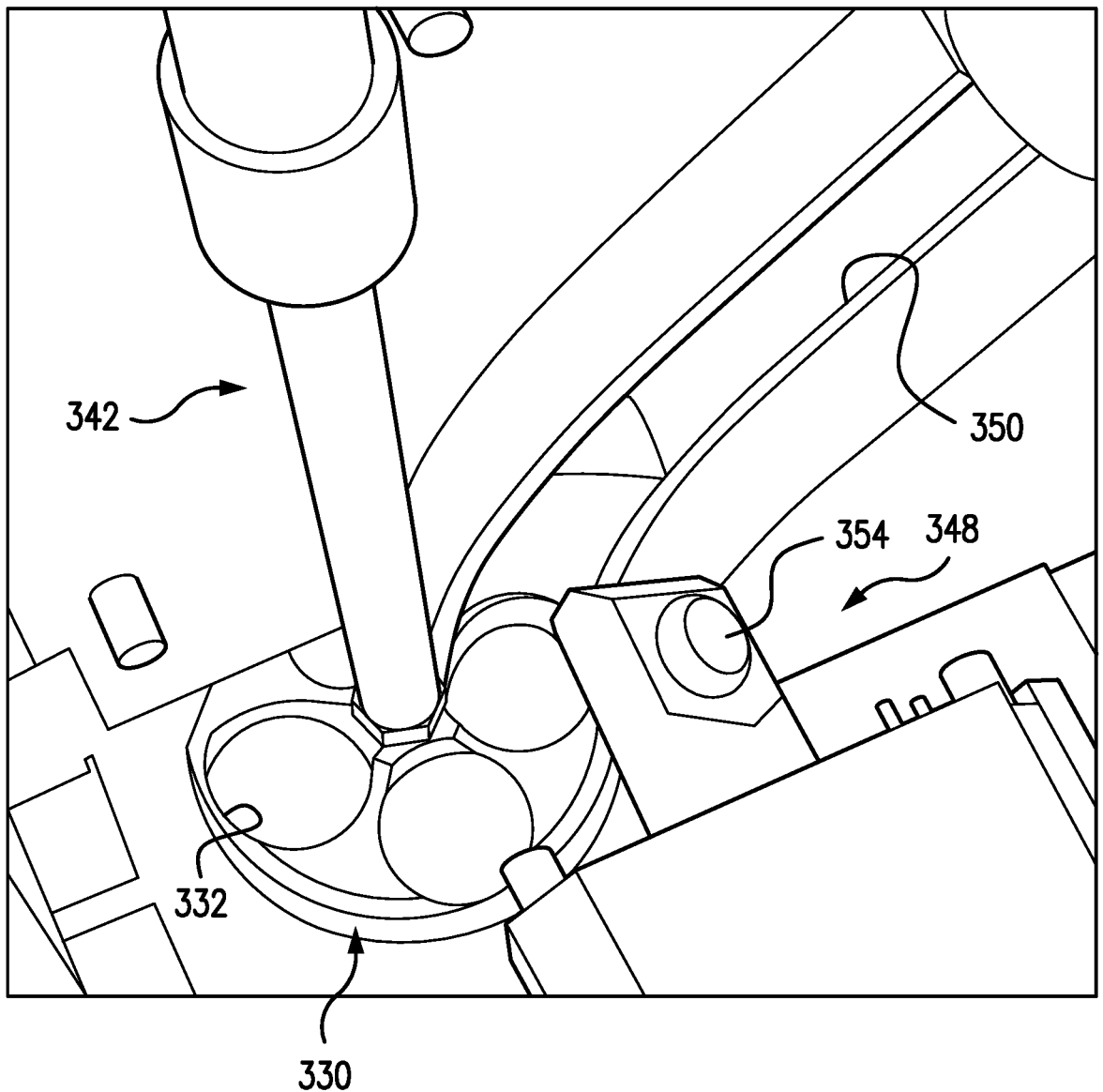

With the removal of closure plug 322, target flask 330 is now accessible and moved to a second compartment 340 of flask loader assembly 300, as shown in FIGS. 6E and 6F. Target flask 330 preferably includes a plurality of target cavities 332, each target cavity being capable of slidably receiving a pair of previously irradiated target capsules 190, and a central recess 334. Central recess 334 is configured to slidably receive a bayonet fitting 341 that includes a pair of opposed projections 346 and is disposed at a lowermost end of a vertical lift spear 342. After central recess 334 of target flask 330 is aligned beneath vertical lift spear 342, vertical lift spear 342 is lowered into central recess 334 and rotated approximately 90° so that projections 346 of bayonet fitting 341 engage corresponding recesses (not shown) defined in the interior of central recess 334. Once properly engaged with target flask 330, vertical lift spear 342 is raised so that one of the flask's target cavity 332 is aligned with an exit opening of a pneumatic delivery tube 350 of flask loader assembly 300, as shown in FIGS. 6G and 6H.

Prior to receiving a previously irradiated target capsule 190, an arrest piston 348 is extended outwardly into pneumatic delivery tube 350 through an aperture formed inside thereof. Note, an arresting flow is also used in the preferred embodiment to help slow and/or stop the previously irradiated target capsules 190 prior to encountering arrest piston 348. A receiving surface 354 is disposed on a distal end of arrest piston 348 and is configured to receive target capsules 190 as they enter flask loader assembly 300. Once a target capsule 190 has been received on the shock-absorbing receiving surface 354, arrest piston 348 is withdrawn from pneumatic delivery tube 350 so that the corresponding target capsule 190 is gently lowered into the corresponding target cavity 332, as shown in FIG. 6H. After a second irradiated target capsule 190 is disposed in the corresponding target cavity 332, lift spear 342 is indexed 90° in order to align a second empty target cavity 332 into alignment with pneumatic delivery tube 350. This process is repeated until each irradiated target capsule 180 is received in a corresponding target cavity 332. Once the target flask 330 is fully loaded, lift spear 342 is lowered until target flask 330 is once again received in casket 320 that is positioned in cradle 304 of drawer 302, at which point lift spear 342 is disengaged from target flask 330. Target flask 330 is once again moved to first compartment 310, at which point plug puller 308 lowers closure plug 322 into position on casket 320. Drawer 302 is now slid outwardly from flask loader assembly 300 and closure plug 322 is once again secured to casket 320 by threaded fasteners 324, at which point it may be moved by jib crane 392 into transfer overpack 340 and secured therein with lid 342, as shown in FIG. 6A. The previously irradiated target capsules 190 are now prepared for transfer to a desired processing facility.

These and other modifications and variations to the invention may be practiced by those of ordinary skill in the art without departing from the spirit and scope of the invention, which is more particularly set forth in the appended claims. In addition, it should be understood that aspects of the various embodiments may be interchanged in whole or in part. Furthermore, those of ordinary skill in the art will appreciate that the foregoing description is by way of example only, and it is not intended to limit the invention as further described in such appended claims. Therefore, the spirit and scope of the appended claims should not be limited to the exemplary description of the versions contained herein.

The invention claimed is:

1. A target irradiation system for irradiating a radioisotope target in a vessel penetration of a fission reactor having a pressure boundary, comprising:
    a target elevator assembly including a body portion defining a central bore and an open bottom end, a center tube that is disposed within the central bore of the body portion and defines a central bore, a target basket including a cylindrical sidewall defining a central bore and a bottom flange, the target basket being slidably receivable within the center tube, and a cable drive assembly that is connected to the target basket by a cable, the target elevator assembly being mounted to the vessel penetration of the reactor; and
    a target passage that is in fluid communication with the target elevator assembly,
    wherein the target basket is configured to receive the radioisotope target therein via the target passage and be lowered through the vessel penetration into the reactor when irradiating the radioisotope target, the target elevator assembly forms a portion of the pressure boundary of the reactor when in fluid communication with the reactor, the target basket is movable between a first position in which the target basket is disposed within the central bore of the center tube and a second position in which the target basket is disposed within the fission reactor, and the bottom flange of the target basket forms a seal with a bottom of the center tube when the target basket is in the first position.

2. The target irradiation system of claim 1, wherein the fission reactor is a heavy-water moderated fission reactor.

3. The target irradiation system of claim 2, wherein the radioisotope target is comprised of natural molybdenum.

4. The target irradiation system of claim 1, wherein the target elevator assembly is mounted to the vessel penetration so that a portion of the body portion of the target elevator assembly extends downwardly into the vessel penetration.

5. The target irradiation system of claim 1, wherein the cylindrical side wall of the target basket includes a plurality of apertures so that a moderator fluid of the fission reactor may enter the target basket when the target basket is in the second position and disposed in the fission reactor.

6. A target irradiation system for irradiating a radioisotope target in a vessel penetration of a fission reactor including a pressure boundary, comprising:
    a target elevator assembly including a body portion defining a central bore and an open bottom end, a center tube that is disposed within the central bore of the body portion and defines a central bore having a bottom surface, a target basket including a cylindrical sidewall and a bottom flange, the target basket being movable between a first position in which the cylindrical sidewall of the target basket is disposed within the central bore of the center tube and a second position in which the target basket is disposed within the fission reactor; and
    a target passage that is in fluid communication with the target elevator assembly,
    wherein the target basket is configured to receive the radioisotope target therein via the target passage and be lowered through the vessel penetration into the reactor when irradiating the radioisotope target, and the bottom flange of the target basket forms a seal with the bottom surface of the center tube when the target basket is in the first position.

7. The target irradiation system of claim 6, further comprising a cable drive assembly that is connected to the target basked by a cable.

8. The target irradiation system of claim 6, wherein the target elevator assembly forms a portion of the pressure boundary of the reactor when in fluid communication with the reactor.

9. The target irradiation system of claim 6, wherein the fission reactor is a heavy-water moderated fission reactor.

10. The target irradiation system of claim 9, wherein the radioisotope target is comprised of natural molybdenum.

11. The target irradiation system of claim 6, wherein the target elevator assembly is mounted to the vessel penetration so that a portion of the body portion of the target elevator assembly extends downwardly into the vessel penetration.

12. The target irradiation system of claim 6, wherein the cylindrical side wall of the target basket includes a plurality of apertures so that a moderator fluid of the fission reactor enters the target basket when the target basket is disposed in the fission reactor.

\* \* \* \* \*